(12) United States Patent
Pleva et al.

(10) Patent No.: US 11,567,468 B2
(45) Date of Patent: Jan. 31, 2023

(54) SYSTEMS, METHODS, AND APPARATUS TO MONITOR AND CONTROL AN AQUATIC FACILITY

(71) Applicant: SENTRY VALVE COMPANY, INC., Woodward, IA (US)

(72) Inventors: Mark G. Pleva, Woodward, IA (US); Patrick D. Gashe, Perry, IA (US)

(73) Assignee: SENTRY VALVE COMPANY, INC., Woodward, IA (US)

( * ) Notice: Subject to any disclaimer, the term of this patent is extended or adjusted under 35 U.S.C. 154(b) by 287 days.

(21) Appl. No.: 16/948,848

(22) Filed: Oct. 2, 2020

(65) Prior Publication Data
US 2022/0107614 A1    Apr. 7, 2022

(51) Int. Cl.
*G05B 19/042*    (2006.01)

(52) U.S. Cl.
CPC .... *G05B 19/042* (2013.01); *G05B 2219/2605* (2013.01); *G05B 2219/2658* (2013.01)

(58) Field of Classification Search
CPC .................................................. G05B 19/042
USPC .......................................................... 700/28
See application file for complete search history.

(56) References Cited

U.S. PATENT DOCUMENTS 6,003,164 A * 12/1999 Leaders ................... C02F 1/008
                                                         4/496
2013/0086195 A1* 4/2013 Hiniker ............... H04L 61/106
                                                         709/208

FOREIGN PATENT DOCUMENTS

WO    WO-2019063648 A1 *  4/2019    ............. G01N 33/18

OTHER PUBLICATIONS

Reliance, SCADA success stories at Kadan Swimming Pool, www.reliance-scada.com/en/success-stories/other/visualization-and-control-of-the-water-filtering-and-heating-system-at-kadan-swimming-pool (courtesy archive.org) (Year: 2019).*

* cited by examiner

*Primary Examiner* — Mohammad Ali
*Assistant Examiner* — Joshua T Sanders
(74) *Attorney, Agent, or Firm* — McKee, Voorhees & Sease, PLC

(57) ABSTRACT

Apparatus, systems, and methods to monitor and control operation of an aquatic facility comprising a water basin, a water supply subsystem, and other subsystems. A simplified, centralized, scalable control subsystem comprises a base controller including with inputs and outputs and a human-machine interface. Sensors are operatively connected to the base controller and adapted to directly or indirectly sense one of a pre-selected set of parameters related to the operation of the aquatic facility. Actuators are operatively connected to the base controller and adapted to directly or indirectly actuate one of a pre-selected set of operations of the aquatic facility. The base controller is programmable relative to setpoints or other operational criteria of the aquatic facility; and actuation of at least a base subset of the actuators and graphical representation of the facility and the water supply, and the at least one subsystem, and the pre-selected operations of the aquatic system.

22 Claims, 36 Drawing Sheets

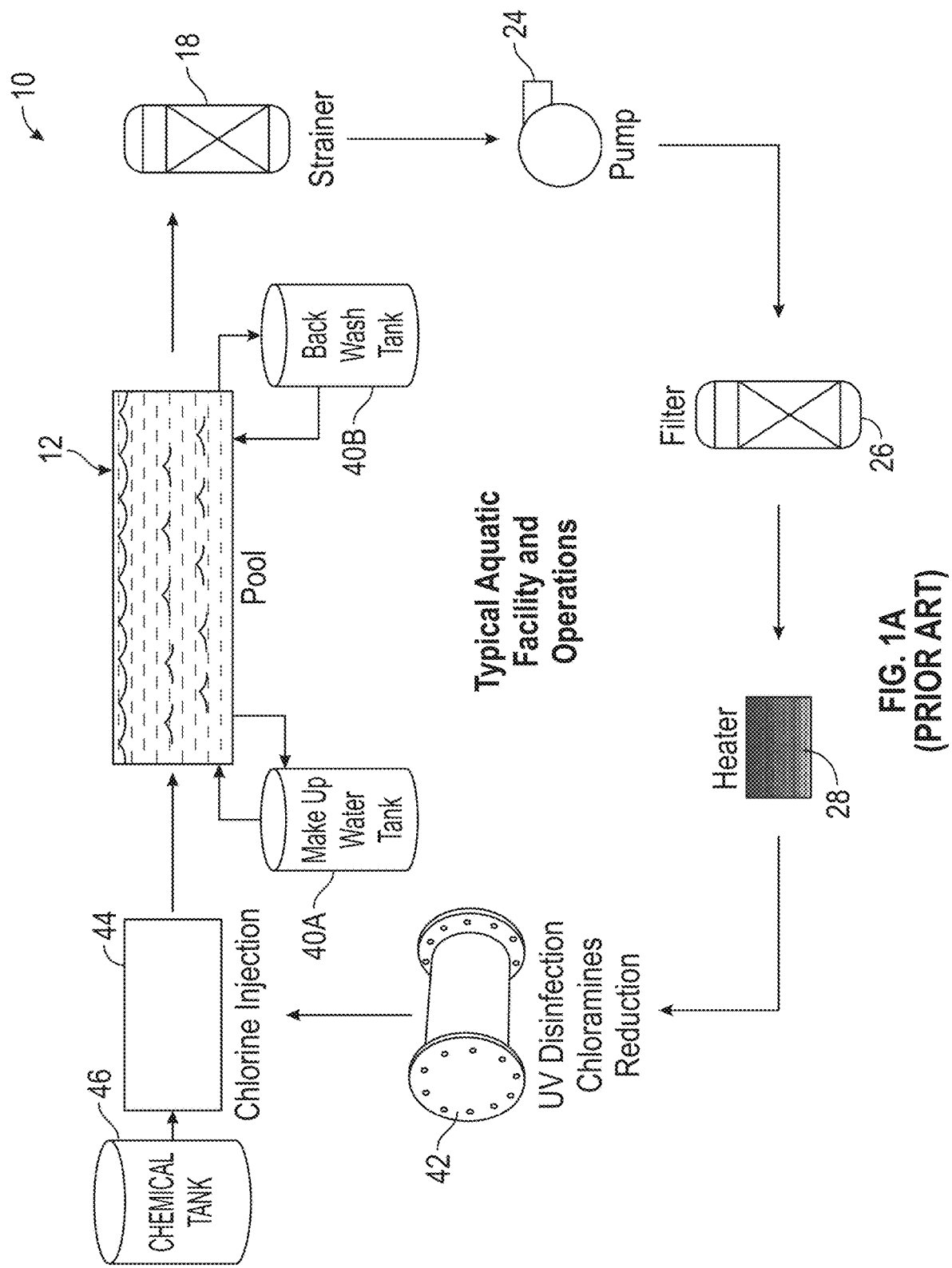

Figures 1B, 1C:
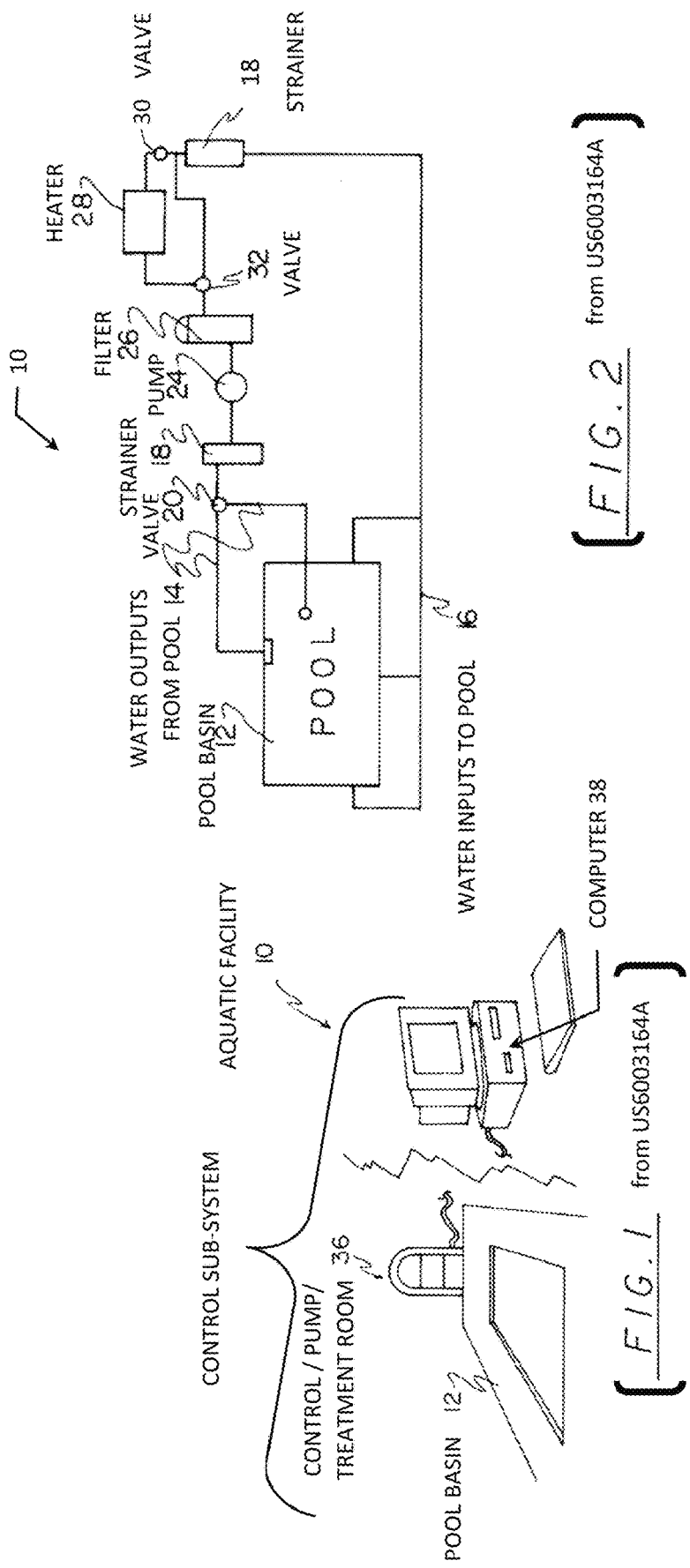

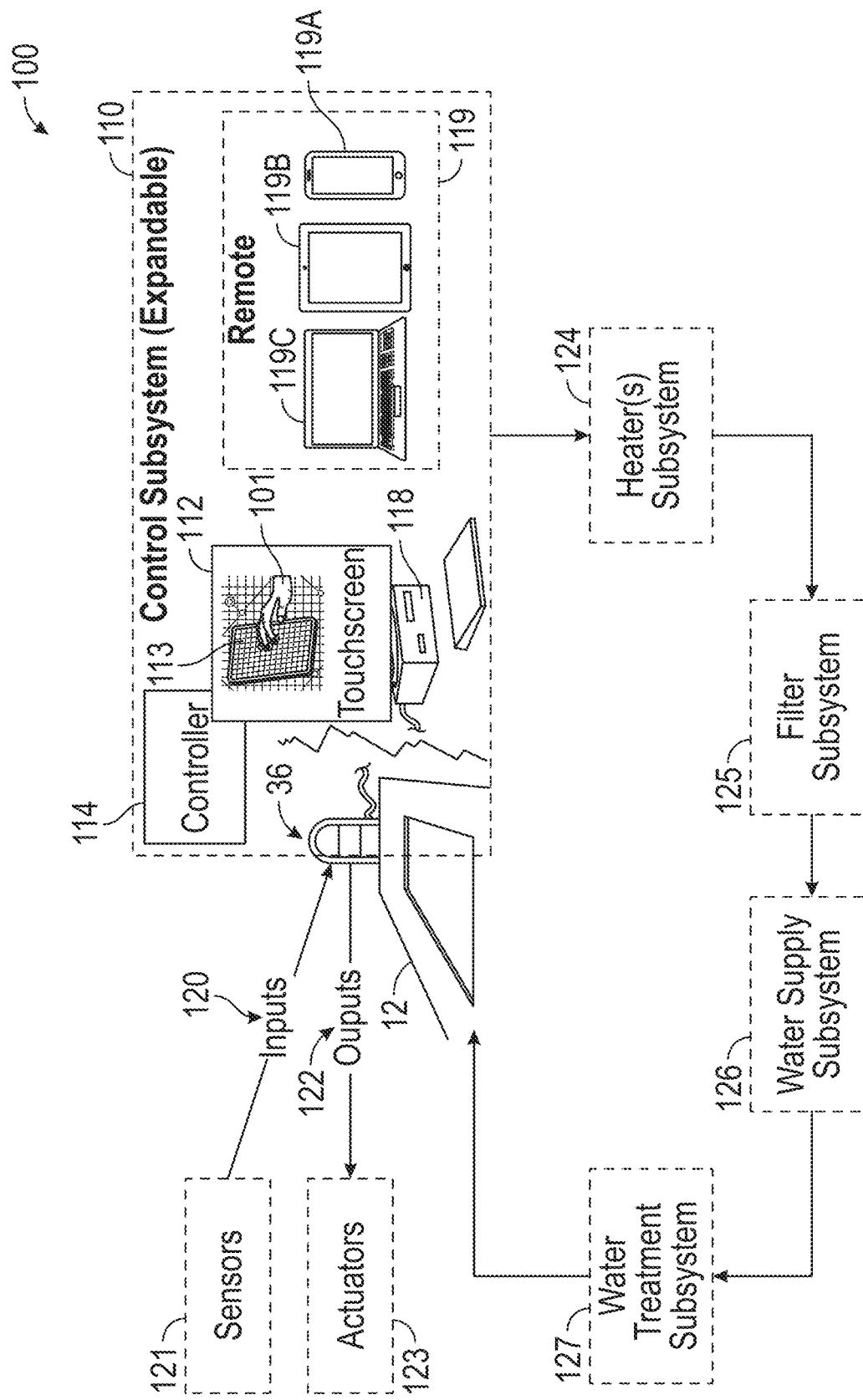
FIG. 2A (INVENTION)

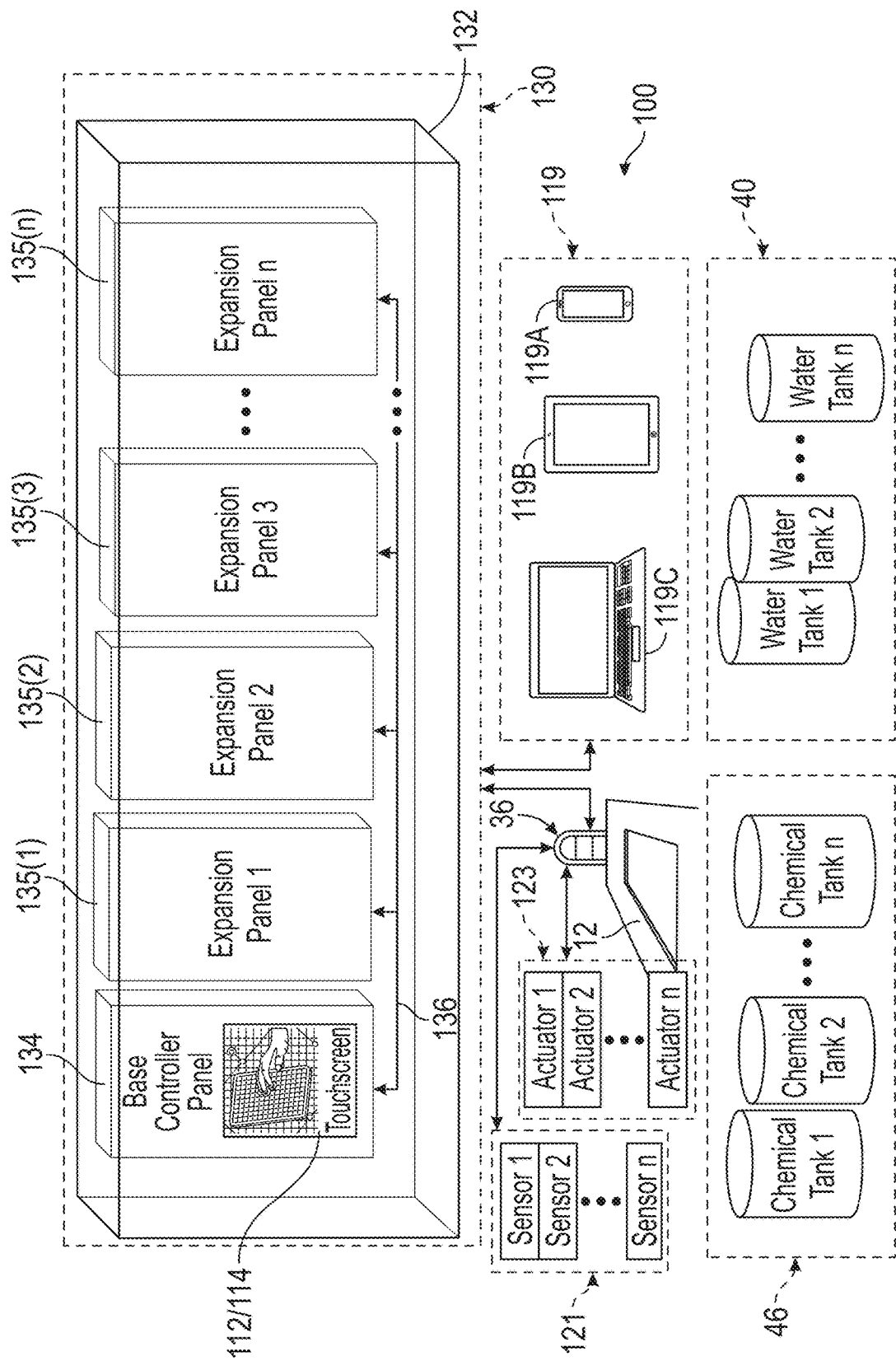
FIG. 2B (INVENTION)

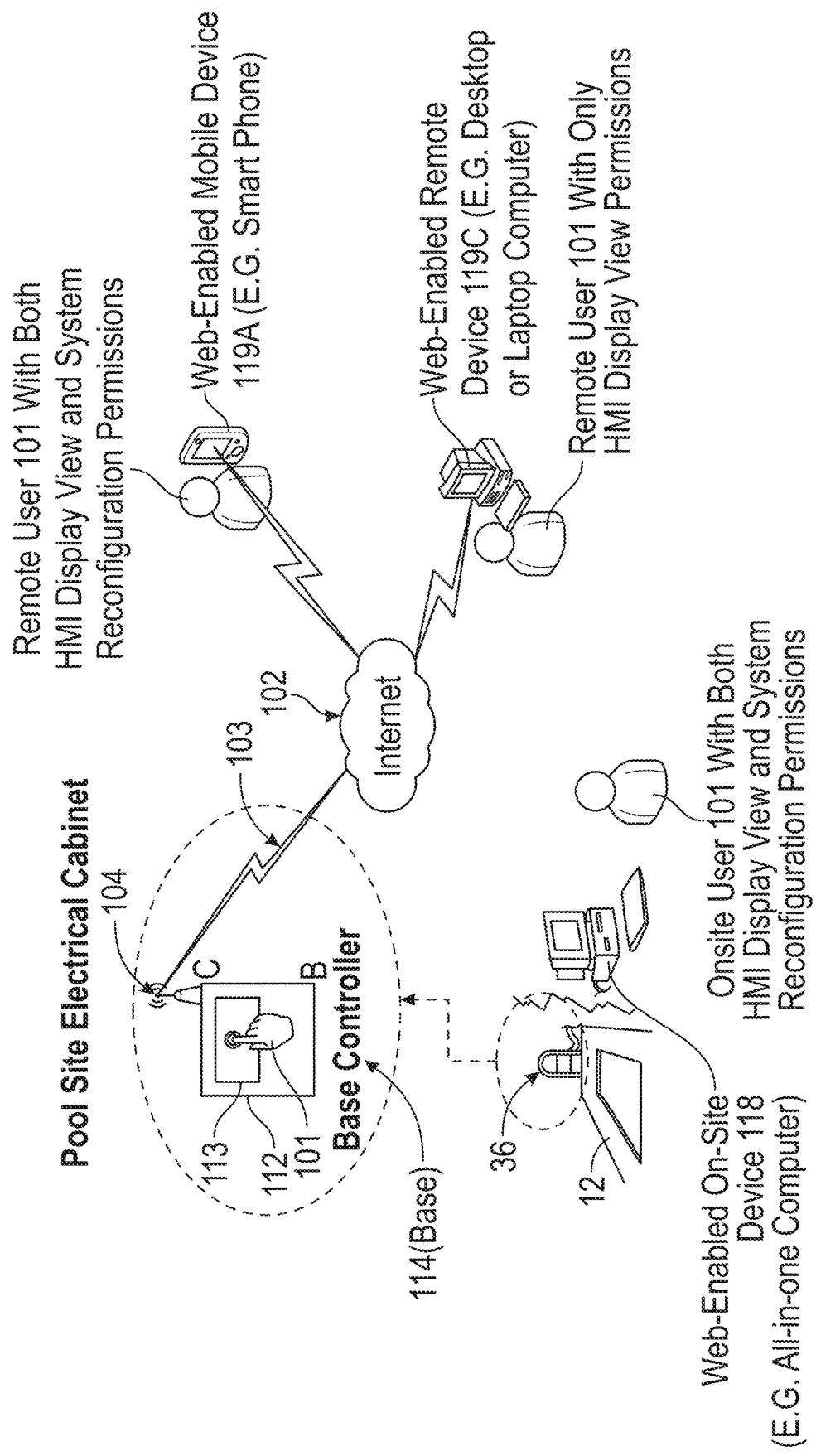
FIG. 2C (INVENTION)

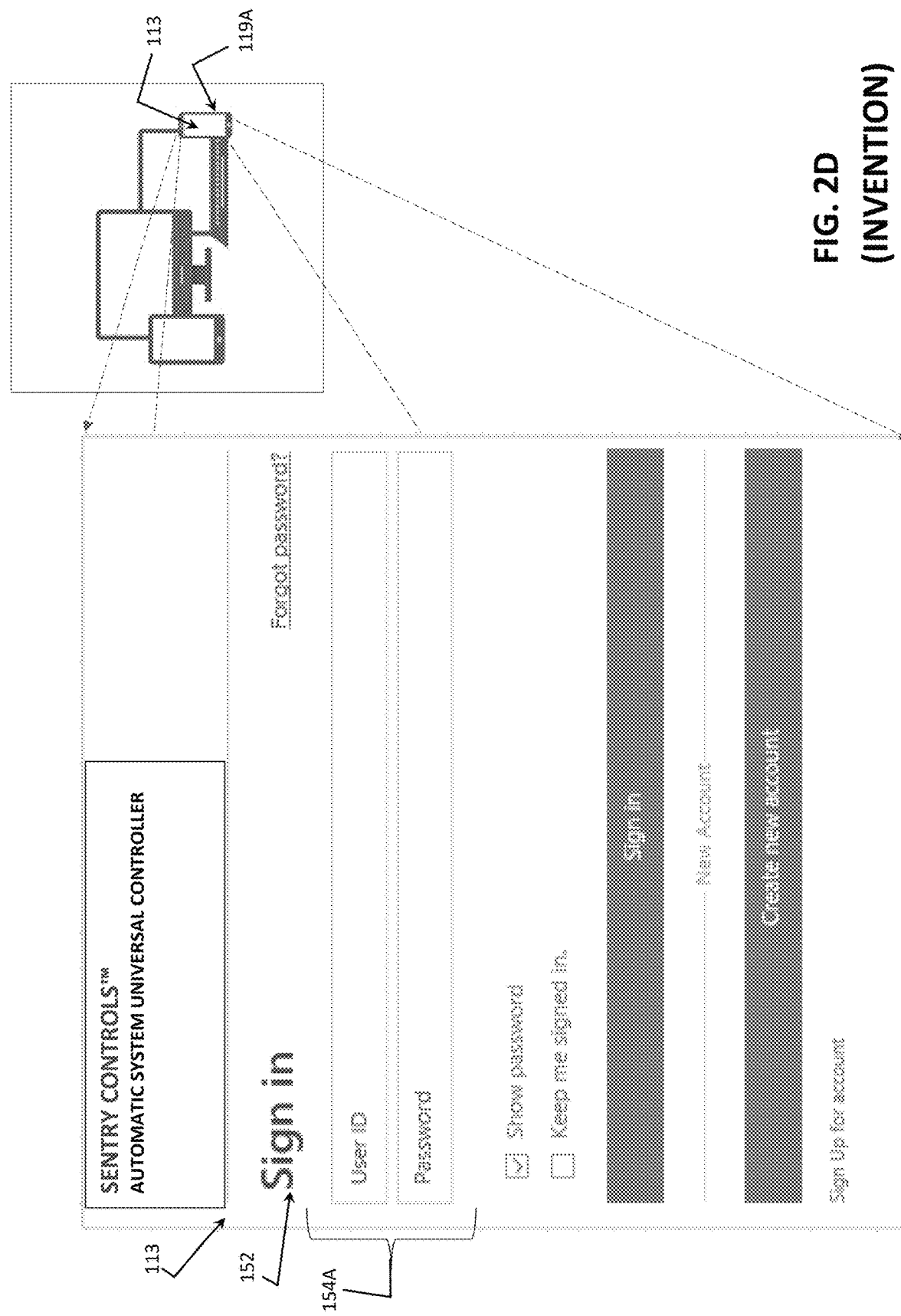
FIG. 2D (INVENTION)

[Authentication Examples]

Base Controller Parts List Note: Parts Numbers are for reference only and are not manufacturer specific

| Item | ID | Description | Detail | Part Number |
|---|---|---|---|---|
| 1 | ENC1 | Enclosure | 24 x 20 x 10 Fiberglass Enclosure | Stahlin J2420HPL |
| 2 | PNL1 | Panel | 24 x 20 Aluminum Panel | Stahlin BPJ2420AL |
| 3 | MD1 | Controller | Building Automation System Controller | Taco GLE-EG534-100U-N4 |
| 4 | PC1 | Computer | Windows 10 Industrial All-In-One | |
| 5 | VPN1 | VPN Module | Virtual Private Network Module | StrideLinx SE-SL3011 |
| 6 | CB1 | Circuit Breaker | 4A - 1 pole breaker | Phoenix TMC 81C 4A |
| 7 | CB2 | Circuit Breaker | 10A - 1 pole breaker | Phoenix TMC 81C 10A |
| 8 | CB3-5 | Circuit Breaker | 20A - 1 pole breaker | Phoenix TMC 81C 20A |
| 9 | PS1 | Power Supply | 24Vdc out - 120Vac supply - 240W | Rhino PSB-24-240 |
| 10 | C1 | Contactor | 16A - 4 pole - 24Vdc Coil | Weg CWC016-00-40L03 |
| 11 | CS1 | Contactor Surge Suppressor | 12 - 600Vdc Surge Suppressor | Weg DICO-1C33 |
| 12 | TBx | Terminal Block | Gray 26-10 AWG - 30A | Konnect-it KN-10GRY |
| 13 | TBx | Terminal Block | White 26-10 AWG - 30A | Konnect-it KN-10WHT |
| 14 | TBx | Terminal Block | Green 26-10 AWG - 30A | Konnect-it KN-10GRN |
| 15 | TBx | Terminal Block | White 26-12 AWG - 20A | Konnect-it KN-12WHT |
| 16 | TBx | Terminal Block | Green 26-12 AWG - 20A | Konnect-it KN-12GRN |
| 17 | TBx | Terminal Block | Red 26-12 AWG - 20A | Konnect-it KN-12RED |
| 18 | TBx | Terminal Block | Yellow 26-12 AWG - 20A | Konnect-it KN-12YEL |
| 19 | TBx | Terminal Block | Blue 26-12 AWG - 20A | Konnect-it KN-12BLU |
| 20 | TBx | Terminal Block Endplate | White - for 20 and 30A terminals | Konnect-it KN-ST1WHT |
| 21 | TBx | Terminal Block Endplate | Green - for 20 and 30A terminals | Konnect-it KN-ST1GRN |
| 22 | TBx | Terminal Block Endplate | Red - for 20 and 30A terminals | Konnect-it KN-ST1RED |
| 23 | TBx | Terminal Block Endplate | Yellow - for 20 and 30A terminals | Konnect-it KN-ST1YEL |
| 24 | TBx | Terminal Block Endplate | Blue - for 20 and 30A terminals | Konnect-it KN-ST1BLU |
| 25 | TBx | Terminal End Stop | Screw stop for DIN rail | Konnect-it KN-EB3 |
| 26 | TBx | Terminal Block Jumper | 4 position for 20A terminals | Konnect-it KN-4J12 |
| 27 | TBx | Terminal Block Jumper | 2 position for 30A terminals | Konnect-it KN-2J10 |

FIGURE 5D

Base Controller Parts List (continued)     Note: Parts Numbers are for reference only and are not manufacturer specific

| 28 | TBx | Terminal Block Jumper | 3 position for 30A terminals | Konnect-it KN-3J10 |
|---|---|---|---|---|
| 29 | TS1 | Pool Water Temperature Sensor | 10k Type III Thermistor | MAMAC TE-703-B |
| 30 | TS2 | Heater Supply Water Temperature Sensor | 10k Type III Thermistor | MAMAC TE-703-B |
| 31 | TS3 | Heater Return Water Temperature Sensor | 10k Type III Thermistor | MAMAC TE-703-B |
| 32 | FS1 | System Water Float Switch | Mechanical Float Switch | |
| 33 | WLS1 | Pool Water Level Sensor | Ultrasonic Level Sensor | Flowline Echopod DL24-00 |
| 34 | FL1 | System Flow Sensor | Thermal Flow Sensor | ProSense FTS200-1002 |
| 35 | FL2 | Makeup Water Flow Sensor | Liquid Flow Transmitter | ProSense FSA75-42-10H |
| 36 | PS1 | Pressure Sensor | 4-20mA -14.7 vacuum to 30psig | ProSense SPT25-20-V30A |
| 37 | PS2 | Pressure Sensor | 4-20mA -14.7 vacuum to 30psig | ProSense SPT25-20-V30A |
| 38 | PS3 | Pressure Sensor | 4-20mA -14.7 vacuum to 30psig | ProSense SPT25-20-V30A |
| 39 | PS4 | Pressure Sensor | 4-20mA -14.7 vacuum to 30psig | ProSense SPT25-20-V30A |

FIGURE 5E

Expansion Controller – Heaters Parts List

| Parts List | | Note: Parts Numbers are for reference only and are not manufacturer specific | |
|---|---|---|---|
| Item | ID | Description | Detail | Part Number |
| 1 | ENC1 | Enclosure | 20 x 20 x 10 Fiberglass Enclosure | Stahlin J2020HPL |
| 2 | PNL1 | Panel | 20 x 20 Aluminum Panel | Stahlin BPJ2020AL |
| 3 | MD1 | Controller | Building Automation System Controller | Taco GLE-XM34IO |
| 4 | CB1 | Circuit Breaker | 5A - 1 pole breaker | Phoenix TMC 81C 5A |
| 5 | TBx | Terminal Block | Blue 26-12 AWG - 20A | Konnect-it KN-12BLU |
| 6 | TBx | Terminal Block | Green 26-12 AWG - 20A | Konnect-it KN-12GRN |
| 7 | TBx | Terminal Block Endplate | Blue - for 20 and 30A terminals | Konnect-it KN-ST1BLU |
| 8 | TBx | Terminal Block Endplate | Green - for 20 and 30A terminals | Konnect-it KN-ST1GRN |
| 9 | TBx | Terminal End Stop | Screw stop for DIN rail | Konnect-it KN-EB3 |
| 10 | TBx | Terminal Block Jumper | 2 position for 30A terminals | Konnect-it KN-2J10 |
| 11 | TS1-8 | Heater Water Temperature Sensor | 10k Type III Thermistor | MAMAC TE-703-B |
| 12 | FL1-8 | Water Flow Sensors | Liquid Flow Transmitter | ProSense FSA75-42-10H |

FIGURE 5H

Expansion Controller – System Parts List

| Parts List | | Note: Parts Numbers are for reference only and are not manufacturer specific | | |
|---|---|---|---|---|
| Item | ID | Description | Detail | Part Number |
| 1 | ENC1 | Enclosure | 20 x 20 x 10 Fiberglass Enclosure | Stahlin J2020HPL |
| 2 | PNL1 | Panel | 20 x 20 Aluminum Panel | Stahlin BPJ2020AL |
| 3 | MD1 | Controller | Building Automation System Controller | Taco GLE-XM34IO |
| 4 | CB1 | Circuit Breaker | 5A - 1 pole breaker | Phoenix TMC 81C 5A |
| 5 | TBx | Terminal Block | Blue 26-12 AWG - 20A | Konnect-it KN-12BLU |
| 6 | TBx | Terminal Block | Green 26-12 AWG - 20A | Konnect-it KN-12GRN |
| 7 | TBx | Terminal Block Endplate | Blue - for 20 and 30A terminals | Konnect-it KN-ST1BLU |
| 8 | TBx | Terminal Block Endplate | Green - for 20 and 30A terminals | Konnect-it KN-ST1GRN |
| 9 | TBx | Terminal End Stop | Screw stop for DIN rail | Konnect-it KN-EB3 |
| 10 | TBx | Terminal Block Jumper | 2 position for 30A terminals | Konnect-it KN-2J10 |
| 11 | GFS1 | Gas Flow Sensor | | |
| 12 | PHS1 | Water pH Sensor | | |
| 13 | FCS1 | Free Chlorine Sensor | | |
| 14 | RS1 | Room Sensor | Temperature and Humidity Sensor | MAMAC HU-225-3-MA-7 |
| 15 | SP1 | Surge Pit Sensor | Ultrasonic Level Sensor | Flowline Echopod DL24-00 |
| 16 | CTS1 | Chemical Tank Sensor | Ultrasonic Level Sensor | Flowline Echopod DL14-00 |
| 17 | CTS2 | Chemical Tank Sensor | Ultrasonic Level Sensor | Flowline Echopod DL14-00 |
| 18 | LS1-2 | Leak Sensor | Water Alert Sensor - DPDT | Dorlen SS-4 |

FIGURE 5K

(INVENTION SPECIFIC EXEMPLARY EMBODIMENT)

Temperature Alarm Configuration

Pool Temperature Low Alarm Setpoint
[+] 80.0 [−]

Pool Temperature High Alarm Setpoint
[+] 95.0 [−]

Heater System Low Alarm Setpoint
[+] 100.0 [−]

Heater System High Alarm Setpoint
[+] 155.0 [−]

PAGE 2

FIG. 6B

Filter Alarm Configuration

Filter Inlet Pressure Low Alarm Setpoint: [+] 10.0 [−]
Filter Inlet Pressure High Alarm Setpoint: [+] 25.0 [−]
Filter Outlet Pressure Low Alarm Setpoint: [+] 5.0 [−]
Filter Outlet Pressure High Alarm Setpoint: [+] 18.0 [−]
Filter Differential Pressure Alarm Setpoint: [+] 15.0 [−]

Strainer Alarm Configuration

Strainer Inlet Pressure Low Alarm Setpoint: [+] 3.0 [−]
Strainer Inlet Pressure High Alarm Setpoint: [+] 10.0 [−]
Strainer Outlet Pressure Low Alarm Setpoint: [+] 5.0 [−]
Strainer Outletlet Pressure High Alarm Setpoint: [+] 15.0 [−]
Strainer Differential Pressure Alarm Setpoint: [+] 10.0 [−]

PAGE 3

FIG. 6C

Flow Alarm Configuration

Heater Flow Low Alarm Setpoint     System Flow Low Alarm Setpoint

[+] 7.9 [−]     [+] 449.8 [−]

Heater Flow High Alarm Setpoint     System Flow High Alarm Setpoint

[+] 20.1 [−]     [+] 850.0 [−]

Runtime Data Resets

Last Reset Date/Time Stamps     Last Reset Date/Time Stamps

256.8 gal [Reset]     5.9 hr [Reset]

Last Reset On 09-Mar-20 8:43 AM CDT     Last Reset On 09-Mar-20 8:13 AM CDT

PAGE 4

213

FIG. 6D

214

Alarms - Email Configuration

Alarms - Primary Email Address
Edit Configuration Field
user1@sentry.com

Alarms - Secondary Email Address
Current Configuration Field
user2@sentry.com

Done

FIG. 6E

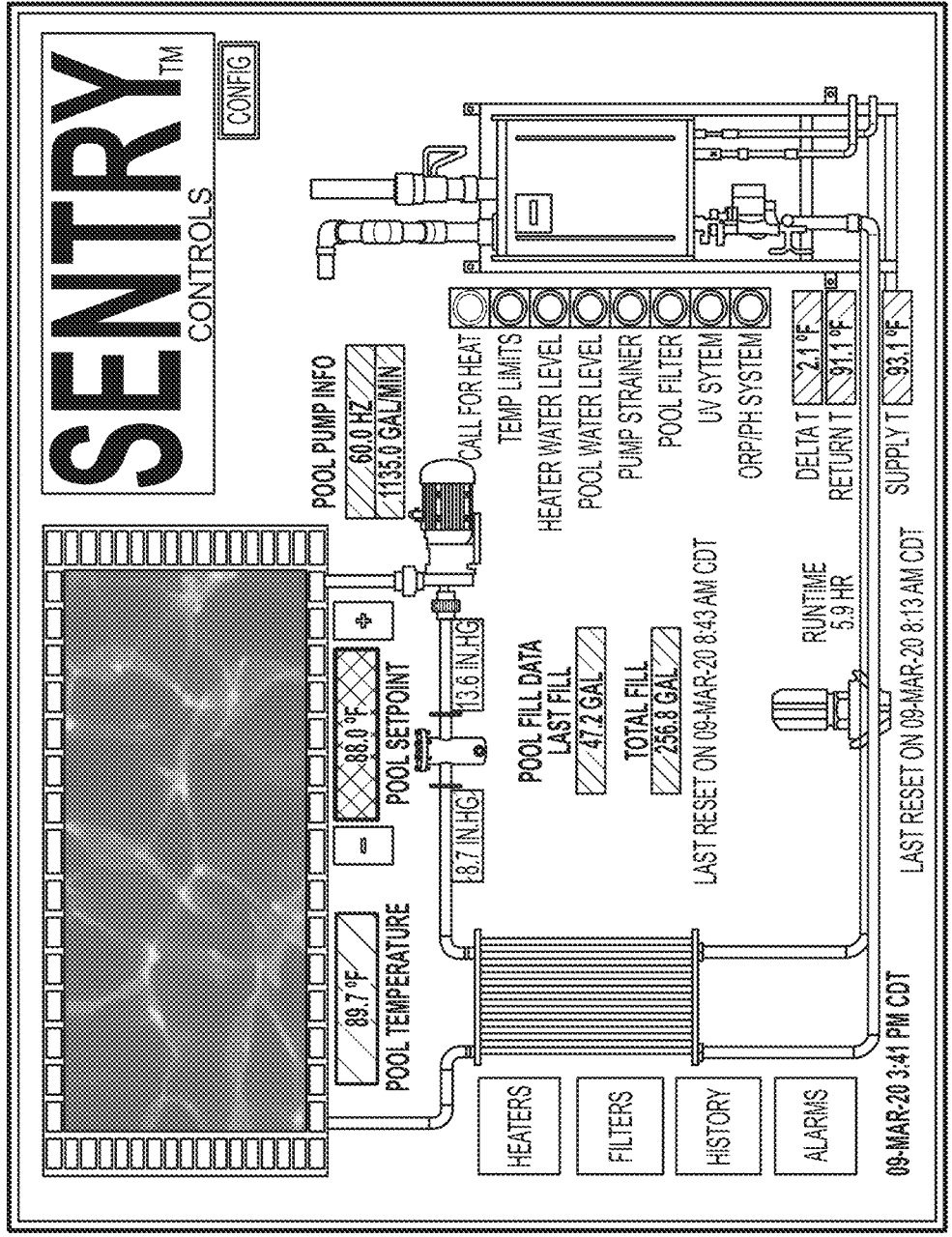
FIG. 7A (POOL SYSTEM)

(HEATER SYSTEM)

(FILTER SYSTEM)

(HISTORICAL DATA)

| Time Range ▼ | ⏱ ? to ? | | Heater 8 Temp\|14 Alarm(s) | |
|---|---|---|---|---|
| Info | Timestamp | Source | Priority▲ | Ack State |
| ⚠ | 04-Mar-20 11:56:10 AM CST | Heater 8 Temp | 255 | Unacked |
| ⚠ | 04-Mar-20 11:50:20 AM CST | Heater 8 Temp | 255 | Unacked |
| ⚠ | 04-Mar-20 11:44:11 AM CST | Heater 8 Temp | 255 | Unacked |
| ⚠ | 04-Mar-20 11:38:20 AM CST | Heater 8 Temp | 255 | Unacked |
| ⚠ | 04-Mar-20 11:32:11 AM CST | Heater 8 Temp | 255 | Unacked |
| ⚠ | 04-Mar-20 11:26:21 AM CST | Heater 8 Temp | 255 | Unacked |
| ⚠ | 04-Mar-20 11:20:11 AM CST | Heater 8 Temp | 255 | Unacked |
| ⚠ | 04-Mar-20 11:14:21 AM CST | Heater 8 Temp | 255 | Unacked |
| ⚠ | 04-Mar-20 11:08:11 AM CST | Heater 8 Temp | 255 | Unacked |
| ⚠ | 04-Mar-20 11:02:20 AM CST | Heater 8 Temp | 255 | Unacked |
| ⚠ | 04-Mar-20 10:44:10 AM CST | Heater 8 Temp | 255 | Unacked |
| ⚠ | 04-Mar-20 10:38:21 AM CST | Heater 8 Temp | 255 | Unacked |
| ⚠ | 04-Mar-20 10:32:11 AM CST | Heater 8 Temp | 255 | Unacked |
| ⚠ | 04-Mar-20 10:26:21 AM CST | Heater 8 Temp | 255 | Unacked |

(Acknowledge) (Hyperlink) (Notes) (Silence) (Filter) (Show All)

SYSTEM

FIG. 7E
(ALARM INFORMATION)

SYSTEMS, METHODS, AND APPARATUS TO MONITOR AND CONTROL AN AQUATIC FACILITY

I. BACKGROUND OF THE INVENTION

A. Field of the Invention

The invention relates to aquatic facilities of a range of sizes and scope that include a pool basin, a water supply subsystem and, typically, several subsystems involved in different functions related to operation of the aquatic facility. In particular, the invention relates to systems, methods, and apparatus to monitor and control those operations.

B. Problems in this Technical Field

1. FIGS. 1A-C—Typical Aquatic Control Set Up

An aquatic facility includes at least on pool basin to hold a relatively large quantity of water. The pool basin can hold from a few to hundreds of persons. A typical aquatic facility 10 within the scope of the present invention includes at least several subsystems to perform different functional operations. FIG. 1A diagrammatically illustrates some examples. A water supply subsystem 24 requires one or more electromechanical pumps, pipes, and valves to supply water to the basin 12. Sometimes there are make-up 40A and back wash 40B subsystems that require pumps and valves. One or more water treatment subsystems 44 can be used. Some require electromechanical actuators (e.g. conveyors or injectors) to move chemicals from storage vessels 46 to the pool water. Some are in-line with the water supply path (e.g. UV disinfection units 42). Many times, a water heating subsystem 28 is in-line the water supply path and uses electric or hydrocarbon fuel to heat the water, which must be connected and controlled. Other water treatment subsystems can be used. Examples are strainers 18 and filters 26.

Even the most basic of such facilities involves the careful control of a plurality of different components with different functions for effective and, many times, continuous operation. Such subsystems avoid use of manual labor for such things as filling the basin, water treatment (including chemical handling). These functions can be impractical for larger pool basins. These subsystems can also avoid human error. Public swimming pools have specific water treatment standards that must be adhered to for public health.

It can therefore be seen that effective operational control of an aquatic facility is not trivial. It involves a variety of needs. Each need has a set of factors to consider and resolve. And these are technical needs. Importantly, some of those factors can conflict. Some can even be antagonistic with one another.

For example, water treatment chemical levels in the pool water must be kept to at least minimum effective levels. It is not an answer, however, to greatly exceed the minimum level. Excessive chemicals can be hazardous to humans. Excessive use of treatment chemicals would be economically wasteful. This is a technical challenge. Number of pool users, ambient conditions, and other factors can influence, with considerable variation over time, the need to add water treatment chemicals to maintain levels within range for safety and health.

Another example relates to efficiency. Heated water requires energy use. Use and ambient conditions can produce wide variability in demand for maintenance of minimum water temperatures over time. Again, it is not a technical solution to overheat the basis water to maintain a minimum water temperature. Of course, for human safety, water temperature cannot exceed certain levels. It requires dynamic adjustment of heaters to dynamically meet minimum temperature requirements. This can be antagonistic with fuel or energy consumption, which is almost antagonistic with economic efficiency of operation. Thus, there must be balancing of these factors for effectiveness with these efficiency concerns.

Another efficiency example relates to pumping, filtering, or straining of water that is supplied or recirculated to the basin. As can be appreciated, filling or maintaining water levels of basins (large basins in particular) can require relatively large electromechanical pumps or devices. Energy loads and usage can be substantial. It is not a technical practicality to use overly-designed pumps for most facilities, as it would be wasteful and impractical.

Thus, a number of technological challenges exist in the control of these types of aquatic facilities.

FIGS. 1B-C diagrammatically illustrate one attempt at a technological solution to the foregoing challenges for a system like system 10 of FIG. 1A. Taken from U.S. Pat. No. 6,003,164, which is incorporated by reference herein, they show an aquatic facility with pool basin 12 and an operations room/building 36 that includes operational subsystems (e.g. water pipes 14/16, strainers 18, valves 20/30/32, pump 24, filter 26). A computer is electrically connected to the control room. It can be used to both monitor operation of at least some of the subsystems. An operator would watch or check the computer display to try to get an indication of basic state of operation of at least some subsystems. Using experience or training, the operator would interpret information on the display and then decide if manual adjustment of any of the subsystems is needed. Such computer monitoring and control is known and has been used in the state of the art.

More recently, such computer-monitoring systems have added the ability to control at least some of the sub-system components from the computer. An operator can use experience or training to interpret information on the display and, then, instruct some action or change in one or more subsystems. See, e.g., U.S. Pat. No. 6,003,164.

However, this still requires substantial operator experience/training as well as operator reaction. Additionally, many existing computer-based systems either require the operator to physically adjust a subsystem operation because of the diversity between, for example, a water pump and its operation interface and protocol versus a water heater operation interface and protocol. Such systems are no more than a partial centralization of both monitoring and control.

Still further, existing technical solutions tend to be either be standardized in terms of capabilities or custom-built for each particular facility. As such, they lack ability to be universal. For example, the custom-built set-up cannot be easily applied to another facility. And the standardized set-up typically has limits on the types and numbers of sub-systems it can monitor and control. Still further, the number of subsystems (e.g. pumping, heating, filtering, treating, etc.), and the variety of components they use, not to mention other ancillary operations components such as valves and tanks, introduces complexity into how all these can be effectively monitored and controlled. A substantial amount of training, experience, and/or know-how is needed to coordinate these diverse subsystems for effective and efficiency aquatic facility operations.

Therefore, room for improvement has been identified in this technical area.

II. SUMMARY OF THE INVENTION

A. Objects, Features and Advantages of the Invention

It is therefore a principle object, feature, and advantage of the present invention to provide systems, method, and apparatus which overcome or solve problems and deficiencies in the state of the art in this technical area.

Further objects, features, or advantages of the present invention include systems, methods, and apparatus which:
  a. Simplify and centralize both monitoring and control. In one embodiment discussed herein, what will be called the SENTRY CONTROLS™ Aquatic System Universal Controller is a BACnet based system designed to simplify and centralize monitoring and control into one complete system.
  b. Provides effective scaling and expandability for a variety of aquatic facilities across a wide range of capabilities, scope, subsystems, and operations. In one embodiment discussed herein, the SENTRY CONTROLS™ Aquatic System Universal Controller is expandable in design so that the end user can decide what aspects of the control system is needed for their specific system.
  c. Provides significant versatility, effectiveness, and efficiency for a wide range of aquatic facilities of varying capabilities and scope, including the ability to simplify and centralize both monitoring and control. In one embodiment discussed herein, from basic swimming pool heating to complete aquatic system control and monitoring, SENTRY CONTROLS™ keeps the system performing efficiently.
  d. Provides an effective human-machine interface to allow users with a wide range of experience and training to utilize the system. In one embodiment discussed herein, SENTRY CONTROLS™ system graphics are displayed via HTML graphics on a 15" touchscreen display. In addition, with the proper authorization, graphics can be viewed on any mobile device (tablet/cell phone) or on a desktop via a Virtual Private Network (VPN) or other network.
  e. Provides for user-access to various system functionalities at different levels of permission to marshal authority relative to the system. In one embodiment discussed herein, accessibility can be limited on a user by user basis. This allows basic personnel access to viewing the system without allowing them to make changes that are reserved for maintenance and management personnel.
  f. Provides the capability of remote access, on a permissions-basis, to monitoring or control, or both.
  g. Provides for an effective automatic notifications capability for the system to notify persons, on a permissions basis, when a state or condition exists that requires attention.
  h. Optionally can store, use, or display acquired information about past system operations for trends or correlations that can inform a user of a condition indicative of need for action. One example would be an indication of need to refill a water treatment chemical tank based on rate of the chemical usage. Another would be an indication for need for maintenance on a filter or strainer if sensed pressure at or near either trends in a certain direction indicative of a blockage. The information can also be used to generate notifications, alarms, or status indicators for the user.
  i. Provides the ability to monitor and control a variety of functionalities in a simplified and centralized manner. Examples include but are not limited to:

System Capability Overview

System Water Temperature Monitoring and Control
Heater System Monitoring and Control
  Gas usage
  Runtimes
Water Pump(s) Monitoring and Control
  Current (ampere) draw
  Flow rates
Filter/Strainer Monitoring and Control
  Pressure monitoring
ORP/pH System Monitoring
  Water chemistry
UV System Monitoring
Water Level Monitoring and Control
  Pool Level Monitoring and Control
  Surge Pit Monitoring and Control
  Makeup Water Fill Monitoring and Control
Chemical Storage Level Monitoring
Alarming Notification
  Visual/audible
  Email/text
Historical and Trending Data Presentation
Air Temperature and Humidity Monitoring
Leak Detection
  Moisture detection in dry areas
BAS (Building Automation System) integration
User specific accessibility to sensitive controls

B. Aspects of the Invention

One aspect of the invention relates to a system for monitor and control of operation of an aquatic facility comprising at least one swimming pool comprising a basin to be filled with water; a water supply subsystem in operative connection to the swimming pool, and one or more subsystems typically used with such aquatic facilities. A simplified, centralized, scalable control subsystem comprises a base controller including a plurality of inputs and outputs and a human-machine interface (HMI) operatively connected to the base controller. A plurality of sensors which does not exceed the plurality of inputs of the base controller are operatively connected to the base controller and adapted to directly or indirectly sense one of a pre-selected set of parameters related to the operation of the aquatic facility. A plurality of actuators which does not exceed the plurality of outputs of the base controller are operatively connected to the base controller and adapted to directly or indirectly actuate one of a pre-selected set of operations related to operation of the aquatic facility. The base controller is programmable with a common programming format relative to setpoints or other operational criteria for at least a base subset of the plurality of sensors for each of at least a base subset of parameters selected from the set of parameters related to operation of the aquatic facility; and actuation of at least a base subset of the plurality of actuators for each of at least a base subset of operations selected from the set of operations related to operation of the aquatic facility and graphical representation of the swimming pool and the water supply, and the at least one subsystem for a given aquatic installation, and the pre-selected operations related to present operation of the aquatic system.

Another aspect of the invention relates to a method of monitoring and control of an aquatic facility that includes simplified, centralized, scalable operation of a number of subsystems, each of which provides some operational functionality to the aquatic facility. The method monitors a variety of operational functions by sensing them directly or indirectly and communicating then to at least a base controller. The method instructs a variety of actuators to control operation of the various subsystems based on the sensed parameters based on a user configuration. If the number of inputs or outputs exceeds capability of the base controller, one or more expansion or satellite controllers can be operatively connected to the base controller. Using the same communication protocols and programming, all interconnected base and satellites can function together. The base controller can include an HMI with an animated graphical representation of operations to assist in visual monitoring and understanding of operations. The HMI can also display quantified information or status information about operations.

Another aspect of the invention relates to a system or method as discussed above, which can utilize specific apparatus for its purposes. In one example, the base controller and ancillary components, can be housing in an enclosure box. If expansion of capabilities is needed, another enclosure box with an expansion controller and ancillary equipment can be operatively connected to the base controller of the first enclosure box.

Another aspect of the invention relates to a system or method or apparatus as described above which can utilize programmable options related to where and who can participate in the monitor or control of a given aquatic facility. In one example, one or more remotely positioned digital devices can communicate with the base controller. Permissions based on user-authentication can allow certain users different levels of access. In one example, one user might have permission to only view operating conditions. Another might also have permission to enter control instructions and/or reconfigure the operation parameters.

These and other objects, features, and advantages of the invention will become more apparent with reference to the accompanying specification.

III. BRIEF DESCRIPTION OF THE DRAWINGS

FIGS. 1A-C are diagrams showing by way of background one example of a prior art aquatic facility with heating, filtering/straining, water treatment, and pumping subsystems, as well as a computerized monitoring of at least some of those subsystems.

FIGS. 2A-F are various diagrammatic illustrations of certain aspects of a generalized embodiment according to the present invention.

FIGS. 3A-B and 4A-C are diagrammatic illustrations of non-limiting examples of system protocol, programming, and communication environments in which aspects of the invention can be implemented.

FIGS. 5A-K are various diagrammatic illustrations and information related to how to build out and make a specific embodiment according to the present invention.

FIGS. 6A-E are mock-ups of screen displays which illustrate how the system of the specific embodiment of FIGS. 5A-K can be set-up and configured for operation.

FIGS. 7A-E are illustrations of screen displays which illustrate how the configured system of FIGS. 6A-E can be operated to monitor and control an aquatic facility.

Figure 8A:
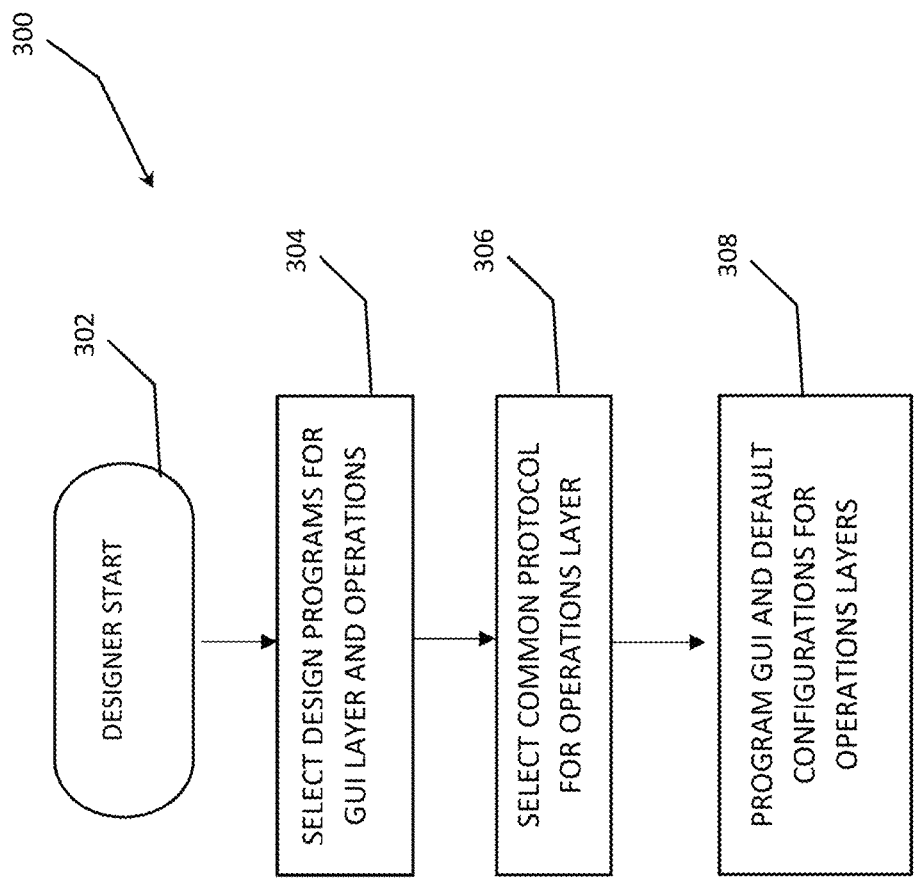
Figure 8B:
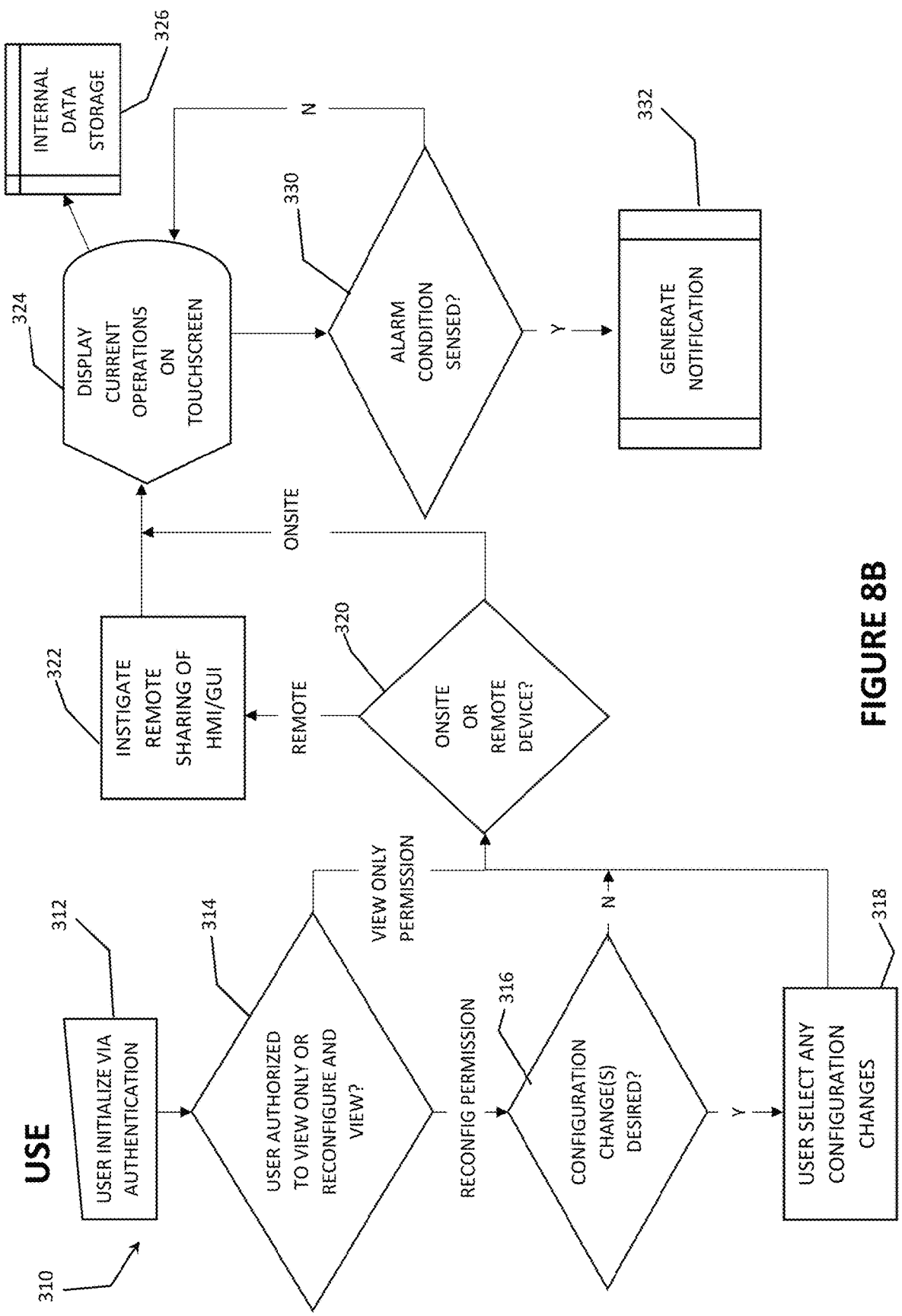

FIGS. 8A-B are flow charts of methods that could be used with embodiments of the present invention.

IV. DETAILED DESCRIPTION OF EXEMPLARY EMBODIMENTS OF THE INVENTION

A. Overview

For a better understanding of the invention and its aspects, exemplary embodiments of how it can be made and used will now be described in detail. These are by way of example and not limitation. They are neither exclusive nor exclusive of all forms and embodiments the invention and its aspects may take.

For example, the embodiments will be illustrated in the context of an aquatic facility that includes water pumping, heating, treatment, and filtering subsystems. Some embodiments include straining, UV treatment, and other chemical treatment sub-systems. The invention can have one or more. It can vary from a basic system (e.g. just one or two such subsystems) to one of many subsystems, including others not mentioned here.

By further example, some embodiments are discussed in the context of specific system-based protocols or environments. Building Automation System (BAS) format computerized distributed system networking and BACnet, a communication protocol of Building Automation and Control (BAC) networks that function within ASHRAE, ANSI, and ISO 16484-5 standard protocols. It is to be understood that the invention is not necessarily limited to these, or the other programming, protocol, or data and physical layers mentioned in the embodiments below.

By further example, the embodiments mention building out the system using HTML, web-enabled webpage type environment, including for programming and operation of the HMI at the base controller and any remote digital devices (e.g. smart phones, tablets, lap tops, desktops) authorized, enabled, and permitted to view the same display and, in some cases, reconfiguration the operation of the system. The invention is not necessarily limited to this arrangement.

B. General Embodiments

With reference to FIGS. 2A-F, a generalized embodiment 100 according to aspects of the invention is shown and described. This embodiment will be discussed in the context of an aquatic facility generically illustrated in FIGS. 1A-C, with a pool basin 12, a set of possible subsystems (e.g. water supply/pumping 126, heating 124, treatment 127, filtering 125, straining), and a control subsystem 110. General background details of such a combination can be found at patent U.S. Pat. No. 6,003,164, incorporated by reference herein, and Published application US 2017/0285672 published Oct. 5, 2017 and incorporated by reference herein, which provides background details on one example of use of a programmable controller to control a heating system of a swimming pool.

The control subsystem according to the present embodiment of the invention differs however at least as follows:

1. FIGS. 2A-B—Centralized but Expandable System Components and Capabilities

As illustrated in FIGS. 2A-B, this embodiment includes a simplified, centralized base controller 114 and touchscreen display 112. For illustration only, non-limiting examples of types of possible subsystems are shown.

A variety of inputs 120 and outputs 122 are possible to the base controller 114. For example, one or more sensors 121 can be communicated as inputs 120. They can be configured to monitor and report a quantification, state, or status of some operational parameter of a subsystem.

One or more actuators 123 can be communicated to from the base controller outputs 122. For example, some type of actuator associated with such operational function of a subsystem can be controlled by such outputs.

The control subsystem 110 can include a human-machine interface or HMI (e.g. touchscreen 112) with displayed content 113 (e.g. graphical rendering of the specific combination of pool basin, subsystems, sensors, actuators, and connections) configured for a given aquatic facility 10. As will be appreciated, this requires at least some specific design and pre-programming so that system 100 generates on the HMI a rendering specific to a given facility 10.

The control subsystem 100 can include, if enabled, one or more digital devices 119 apart from the base controller/display 114/112 that could communicate with the base controller 112 remotely. Examples include desktop or laptop 119C, tablet 119B, and smartphone 119A devices. This allows a device user 101 with certain permission(s), to essentially remotely have the same or similar information 113 generated on the remote device 119 display as on the touchscreen display 112 on-site at the base controller 114. This allows such a user to remotely monitor operation of the aquatic facility 10. In one example, authenticated and permitted remote users 101 can have other privileges. One example would be to adjust or reconfigure the system's operational settings. Thus, this embodiment can basically allow the same or similar remote control of one or more subsystems as if done at the on-site base controller/touchscreen. An on-site computer 118; in communication with base controller 114, can be used also. It can be in an on-site control room 36 or in a dedicated housing or area.

FIG. 2B illustrates an optional physical build-out of the generalized embodiment of FIG. 2A. For scalable expandability, in this embodiment the base controller/touchscreen 114/112 and ancillary components can be housed in a base controller panel box 134 in a larger enclosure box 132 (e.g. akin to typical electrical equipment boxes) accessible to authorized users 101 at on-site locations 130 (whether in or outside room 36). By appropriate wiring or other electrical communication, inputs and outputs 120/130 to the base controller panel 134 in the enclosure 132 can be made. One or more sensors 121 or other inputs used by the base controller 114 not to exceed a maximum number of inputs for the base controller are possible. This allows a first level of scalability or expansion with the base controller/touchscreen 114/112 or the base controller panel 134. The same holds for number of outputs 130; the number of outputs from base controller 114 would not exceed the maximum number for that controller 114. Outputs 122 can be operatively connected to one or more actuators 123 that perform some operation(s) action(s) relative to facility 10 operations.

If more inputs or outputs are needed or desired for a given aquatic facility, a first expansion panel 135(1) with its own controller with additional inputs and outputs can be added and operatively connected to the base controller panel 134. Essentially this satellite panel 135(1) adds expanded capabilities to those of the base controller/touchscreen panel 134. Moreover, as illustrated in FIG. 2B, one or more additional expansion panels 135(2), 135(3), . . . , 135(n) can be similarly integrated with the base controller/touchscreen panel 134 according to need or desire. It is to be understood that additional panels might be added only when a preceding panel inputs and outputs are completely used. But, alternatively, expansion panels can be added so that each is dedicated to a specific subsystem or subset of subsystems, even if all inputs and outputs of other panels are not fully used. This allows substantial versatility to the designer/owner-operator of the overall system. Because all run in integrated manner with the base controller/touchscreen 114/112, the addition of expansion panels 135 and contents does not repeat all components of the base controller/touchscreen panel 134. A communication bus 136 (or other electrical connection(s)) can communicate between panels 134 and 135(1)-(n).

2. FIG. 2C—Remote Devices

FIG. 2C diagrammatically illustrates one way that one or more remote devices 119 can be used with the overall system. In this example, a web page environment is used to generate graphics content 113 at the base controller touchscreen 112. That web page based environment allows, for example, any web-enabled digital device to seek access to at least the same content as on the base controller touchscreen 112.

As indicated at FIG. 2C, this paradigm of centralized, simplified monitoring and control also allows different levels of permissions to different users 101. For example, a manager of the aquatic facility 10 may be given permission of not only monitoring operations but also changing the configuration of the operations remotely from his/her device 119. On the other hand, a non-manager could be given permission only to monitor but not change any configuration of the system. For example, this is an effective way to obtain this functionality with a smart phone 119A, which makes it effective and efficient to, if authorized, enable a variety of persons to remotely monitor any time and almost any place the operations at the aquatic facility. One way is an on-site base controller touch screen 112. Wide area remote access via a device 119 can be accomplished via an appropriate wide area network 102 (e.g. internet, WAN, cellular network, etc.), including wired and wireless legs 103 and appropriate communication devices 104 (e.g. routers, communication boards, etc.). As will be discussed more infra., devices 119, as well as one or more of touchscreen 114, controller 112, and any on-site computer 118 can be web-enabled.

Figure 2E:
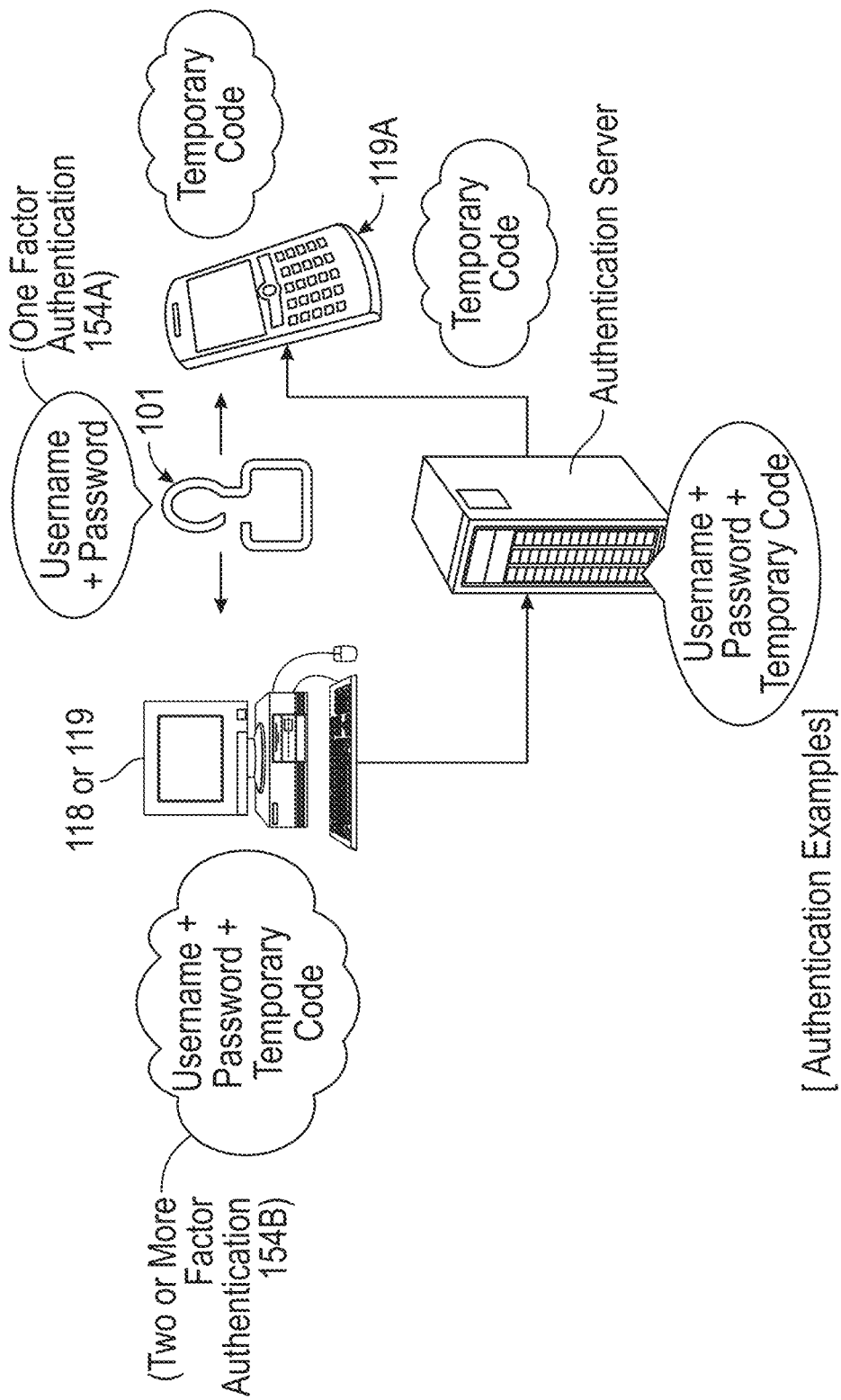

3. FIG. 2D-E—Permissions/Authentication

FIGS. 2D and E diagrammatically illustrate such access and permissions can be facilitated with one or more level authentication. One level would be with sign-in parameters 152 such as one factor authentication 154A (e.g. username and password) (FIG. 2D) at some type of page display (e.g. sing in screen). More robust authentication could be with two or more factor authentication (FIG. 2E), if desired. This allows differentiation between users and permissions with such well-known authentication techniques and components.

Figure 2F:
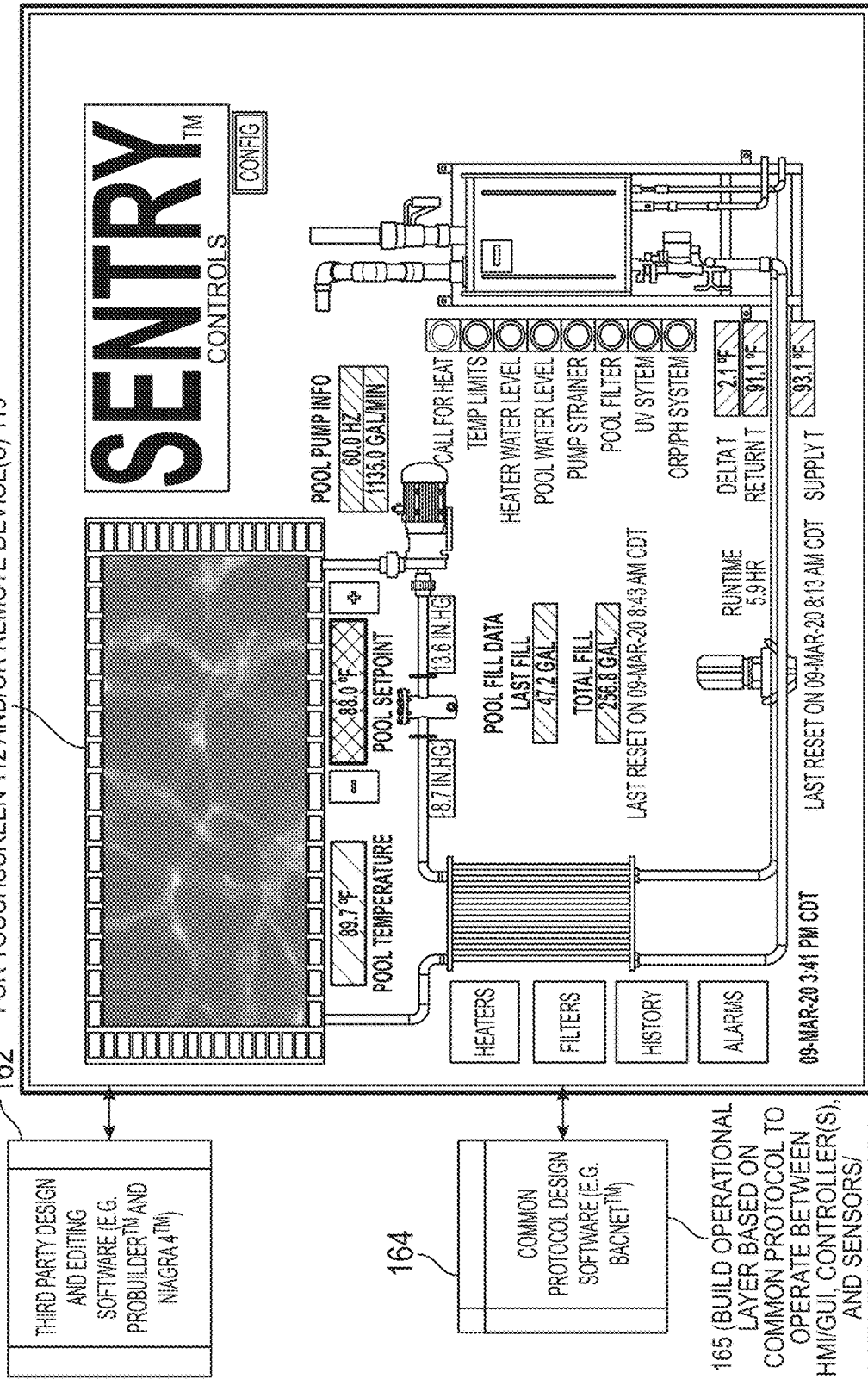

4. FIG. 2F—Common Protocol for Programming Base Controller and HMI

FIG. 2F diagrammatically shows that, in one form, the system according to this embodiment can use common protocols/environments to facilitate such a centralized, simplified, scalable system. In one example, as mentioned above, a web page buildout of the graphics/content for the HMI 112 at the base controller 114 is accomplished by an appropriate software design tool/package 162. Additionally, a common overall architecture 164 (e.g. Building Automation System or BAS, Building Automation and Control or BAC, or other forms of Supervisory Control and Data Acquisition or SCADA) allows not only a common protocol for programming the functionalities of the system, but also communications and interpretation of inputs from a variety of different types of sensors and outputs to a variety of different actuators. BACnet™ is one example of a specific protocol in the context of BAC. See, e.g., www.bacnet.org for background and details.

As will be appreciated, the foregoing generalized embodiment meets at least one or more of the objects, features, advantages, or aspects according to the present invention. Its paradigm addresses the technologic solution of balancing of the many factors involved in operating an aquatic facility in an effective, efficient, and scalable fashion.

C. Specific Embodiment

With reference to FIGS. 3A-B, 4A-C, 5A-K, 6A-E, and 7A-E, a more specific configuration according to an exemplary embodiment of the present invention is set forth. It utilizes one or more of the generalized features of the embodiment set forth immediately above. To the extent there are variations or additional features, they are emphasized below.

1. Overview

This specific embodiment will be discussed in a similar context as the embodiment above to the extent there is a single water basin 12 and at least water pumping 126, heating 124, treating 127, and filtering 125 subsystems that service the water basin 12. A control subsystem 110 utilizes the simplified, centralized, scalable/expandable paradigm of the generalized embodiment above, including the optional abilities of remote monitoring and control with various permission levels, scalability with base 134 and satellite expansion 135(1)-(*n*) panels, effective and efficient monitoring via display of content accessible by a variety of possible users and a variety of possible locations, and centralized control via common-protocol-based operation and a base controller.

Below is set forth how to make and use the specific embodiment, followed by how to operate it in use.

2. How to Make and Use (a) FIGS. 3A-B—Common System-Wide Protocol

In this embodiment, The SENTRY CONTROLS™ Aquatic System Universal Controller is a BACnet based system designed to simplify and centralize monitoring and control swimming pool and/or aquatic facility components, operations and functionality into one complete system. BACnet is an example of a specific communication protocol for Building Automation and Control (BAC) or Building Automation System (BAS) networks that leverage the ASHRAE, ANSI, and ISO 16484-5 standard protocol.

BAS is an example of a distributed control system that uses computer networking of electronic devices. See, e.g., generally ref. no. 170 at FIGS. 3A-B which give background illustrations of the basic structure and techniques of BAS. For additional background, see for example, www.gsa.gov/node/82316 regarding use of BAS to control government buildings.

BACnet was designed to allow communication of building automation and control systems for applications such as heating, ventilating, and air-conditioning control (HVAC), lighting control, access control, and fire detection systems and their associated equipment. See, e.g., generally ref no. 180 at FIGS. 4A-C which give background illustrations of basic structure and techniques of BACnet. The BACnet protocol provides mechanisms for computerized building automation devices to exchange information, regardless of the particular building service they perform. The protocol defines a number of services that are used to communicate between building devices. The protocol services include Who-Is, I-Am, Who-Has, I-Have, which are used for Device and Object discovery. Services such as Read-Property and Write-Property are used for data sharing. As of ANSI/ASHRAE 135-2016, the BACnet protocol defines 60 object types that are acted upon by the services. The BACnet protocol defines a number of data link/physical layers, including ARCNET, Ethernet, BACnet/IP, BACnet/IPv6, BACnet/MSTP, Point-To-Point over RS-232, Master-Slave/Token-Passing over RS-485, ZigBee, and LonTalk. Alternative protocols that could be used in analogous ways exist. Non-limiting examples include X-10; IEEE standards (notably IEEE 802.15.4, IEEE 1901 and IEEE 1905.1, IEEE 802.21, IEEE 802.11ac, IEEE 802.3at), nVoy (which verifies IEEE 1905.1 compliance), or QIVICON. FIGS. 4A-B and 5A-C provide illustrations of the general operating principles of BAS and BACnet. Background details and examples of implementations of BAS, BAC, and BACnet are included at patent U.S. Pat. No. 7,761,563 and Published application US 20130086195A1, both of which are incorporated by reference herein.

(b) FIG. 2F—Programming Design

The system 100 of this embodiment was designed using ProBuilder™ software and runs on the Niagara 4™ (or future upgrades) format. This programming allows for the programming and the graphical interface to be done all within one format.

As will be appreciated by those skilled in this technical art, a variety of software tools are commercially available for such design and programming (see FIG. 2F) and these are but examples. The foregoing are non-limiting examples.

One ability of ProBuilder™ is the ability to design 2D or 3D simulated renderings of any aquatic facility or its subsystems, including the ability to animate the displayed content. This is used here in a subtle but beneficial way. Users, from those highly skilled/experienced to those not, can be provided with visual stimulus or information that can help integrate quickly and accurately operational status of any of the subsystems that is richer in content and understanding than display of data or static content. But further, it can allow any user a visual "snap shot" of system operations from an overall perspective. For example, with animations a quick view can indicate immediately if water movement/supply/pumping is within operating limits (e.g. by animating a moving stream of water, including direction and relative rate of movement). Animations can add other quickly visually perceivable information. One example is to use color to at least show relative temperate at certain water supply pipe locations (e.g. red for hotter, blue for cooler). These are but a few examples. The programming and the designer can program others according to need or desire.

(c) FIGS. 5A-K—Block Diagram and Parts of Specific Inventive Set Up Specific, Aquatic Control Set Up A blueprint and parts list for the specific embodiment are shown at FIGS. 5A-K. In this embodiment, more than the base controller panel 134 is utilized as the number of inputs 120 and/or outputs 122 that have been selected for monitoring and controlling, and other functions, exceeds those available at base controller 114. As will be appreciated by those skilled in this art, this system can be adjusted to accommodate less or more monitoring or control according to need or desire.

In this example, the base controller panel 134 (FIG. 5A center) can include a BAS type, programmable base controller (e.g. Taco GLE-EG534-100U-N4 PLC from Taco Comfort Solutions, 1160 Cranston St., Cranston, R.I. 02920 (USA)) for input/output 120/122 from/to peripherals (e.g. sensors 121 and actuators 123), and includes a computer 118 in operative connection to the base controller 114. In this embodiment the computer 118 is a Windows 10 Industrial All-In-One computer (available commercially from a variety of vendors or OEMs). A Virtual Private Network (VPN) module 105 (e.g. StrideLinx SE-SL3011 available commercially from a variety of vendors) includes WiFi internet connectivity, WiFi LAN and Ethernet ports. ProBuilder™ (see www.procore3d.com/probuilder/) is an example of a specific 3D modeling and design tool used with the Unity real-time 3D development platform (see www.unity.com/features/multiplatform). It allows design of graphic representation of an aquatic facility, its subsystems, and their interoperability. As will be appreciated, other such software tools that have analogous features can be used. Niagara 4 (available from a variety of commercial vendors) is an example of a software platform to manage and control diverse systems and devices regardless of manufacture or protocol. It can be used locally or over the Internet with a standard web browser. It provides visualization, integration, control and archiving of data. See www.ccontrols.com/techniagara.htm for more information.

Figure 6A:
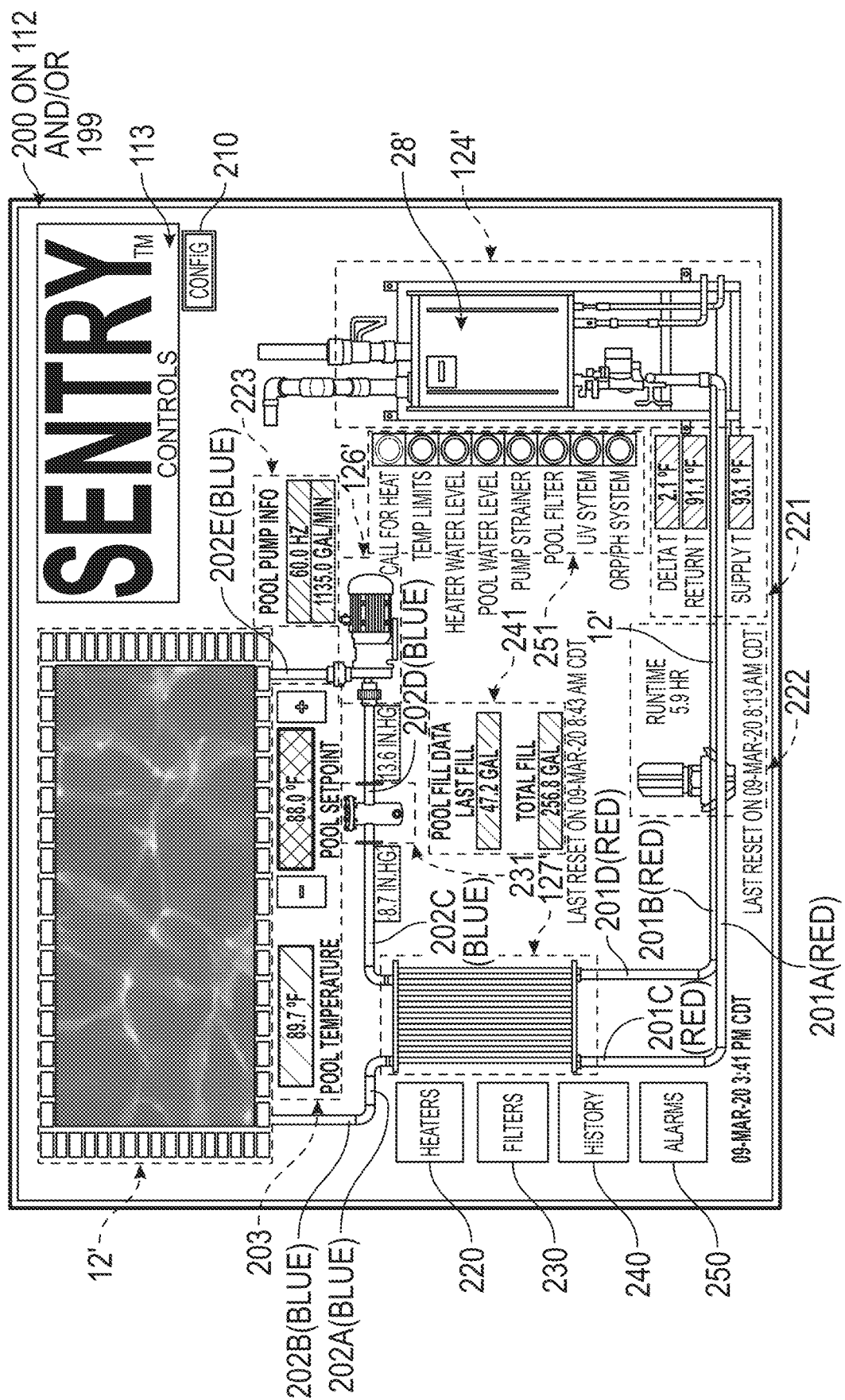

The graphical interface is animated to show system functionality. See, e.g., FIGS. 6A-E, 7A-E. ProBuilder™ allows animation of functions for display on the base controller touchscreen display 113. An example would be water flow and direction, water temperature, and so on. It also allows real-time graphic representation of system parameters. Examples are shown in FIG. 6A. Real-time quantifications of such things as temperatures, pressures, flow, and so on are possible according to designer need or desire. Additionally, visual indicators of state or status are possible (e.g. simulations of green light on for within operating limits or set points, versus red light on for outside such limits). The tool and its platform allow from more basic builds to sophisticated 3D animations. It can further call up and display stored data. An example is FIG. 6A is "last fill" and "last reset" data. This can help a user in evaluating and taking action, if deemed needed, regarding one or more operations.

The graphical interface is Web Page based and can be viewed remotely using any web browser. Development tools such as ProBuilder allow its presentations to be published to multiple platforms and devices. Examples are all major augmented reality (AR), virtual reality (VR), mobile, desktop, console, web, and TV platforms (see www.unity.com/features/multiplatform). Thus, a Web Page based delivery is possible and is leveraged in this specific embodiment. Advantages include ease of use, ease of design, and interoperability with most web-enabled devices. See FIGS. 2A-C. The Web Page approach is illustrated at FIG. 2D. As in traditional GUI design, a Web Page based design allows control of every pixel on the screen: it will look exactly the same on each user's screen.

Figure 3A:
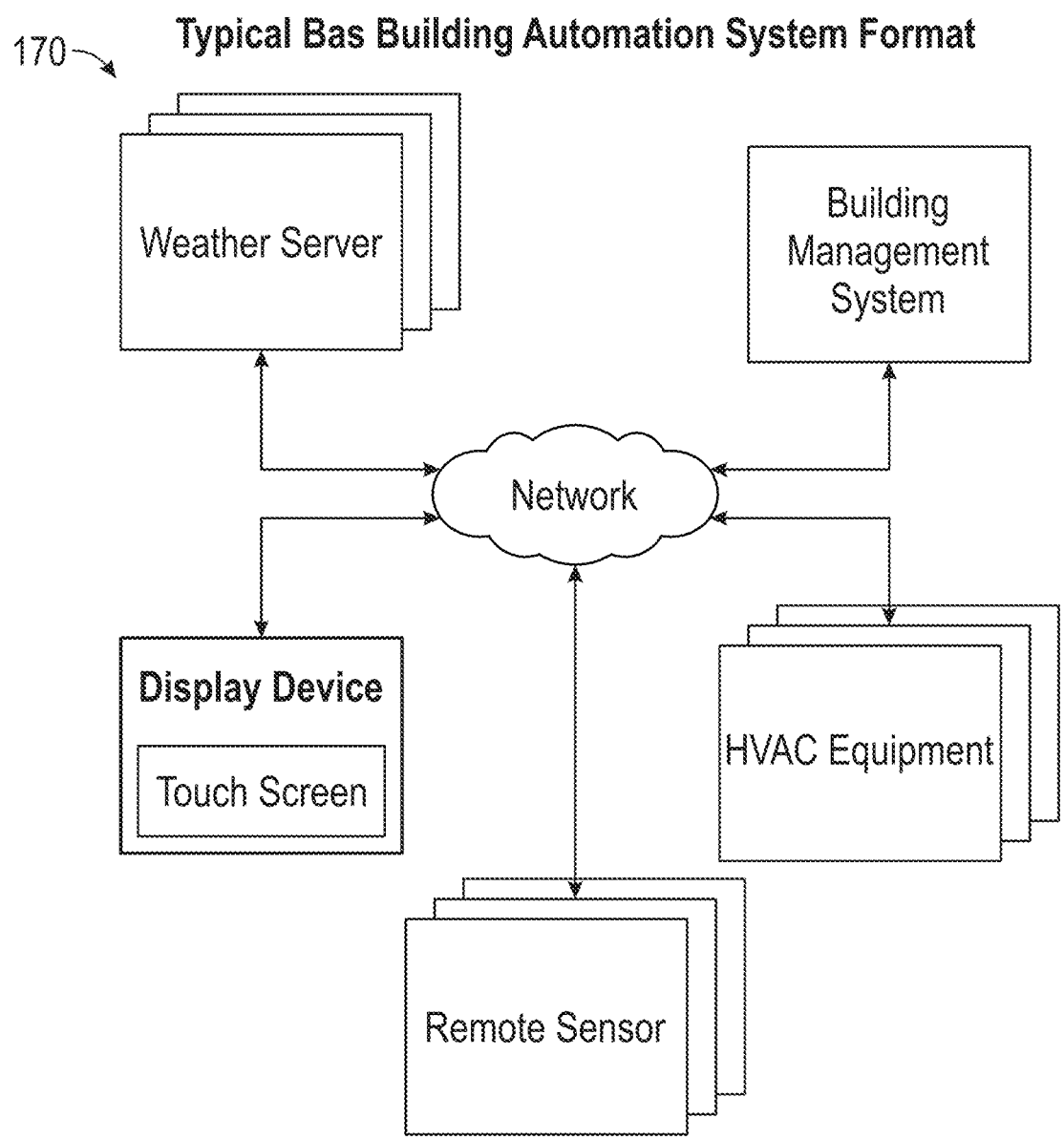
Figure 3B:
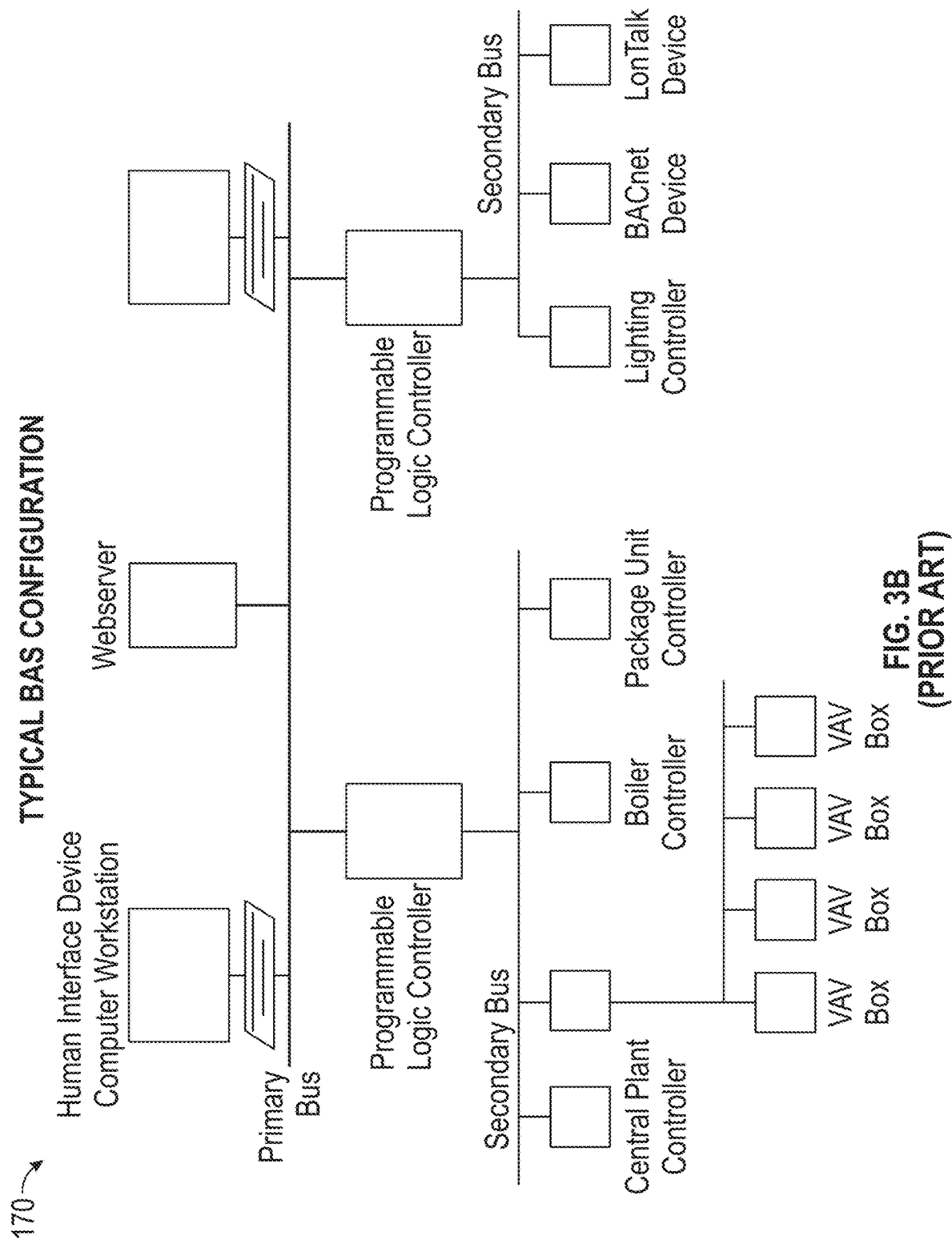
Figure 4A:
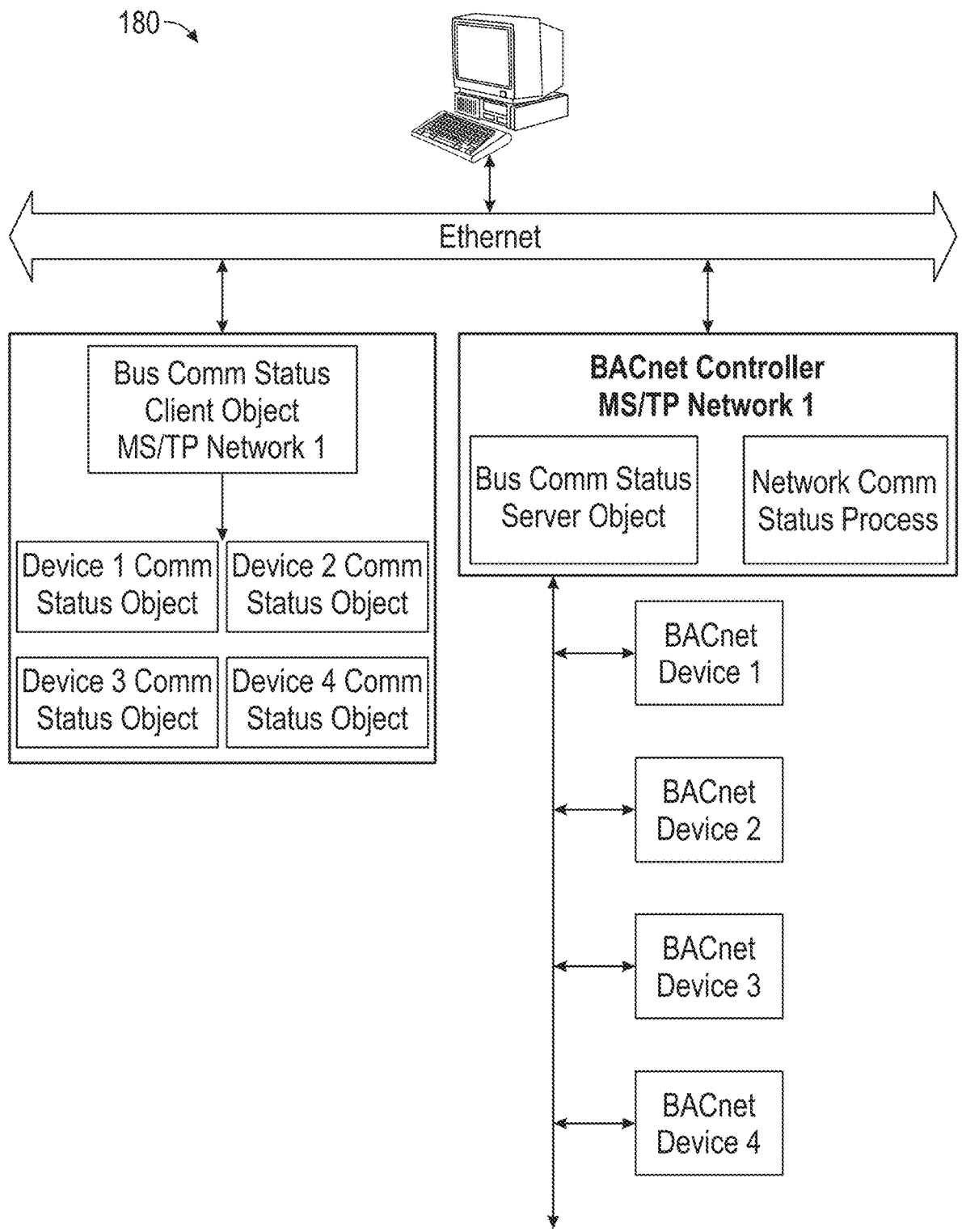
Figure 4B:
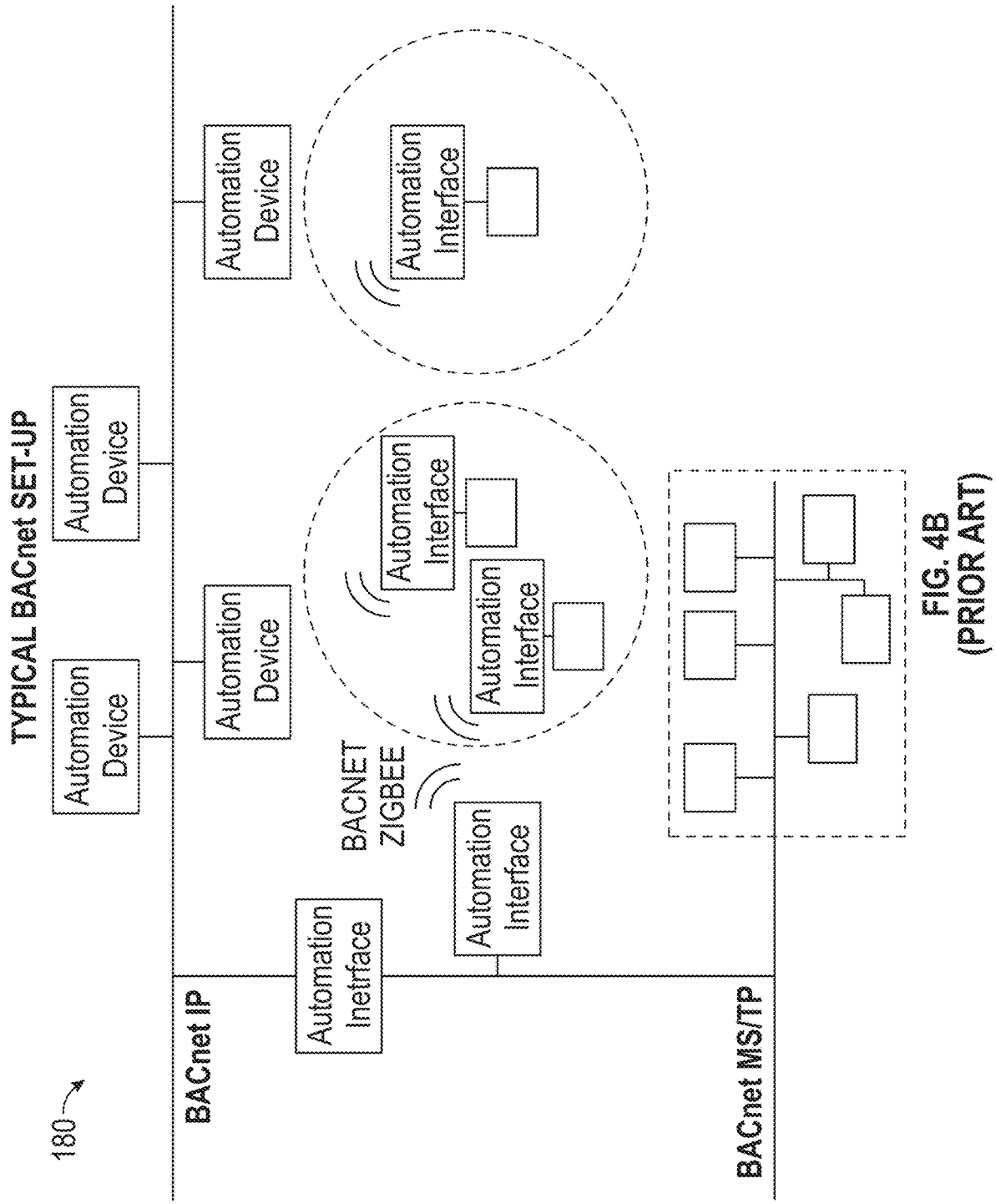
Figure 4C:
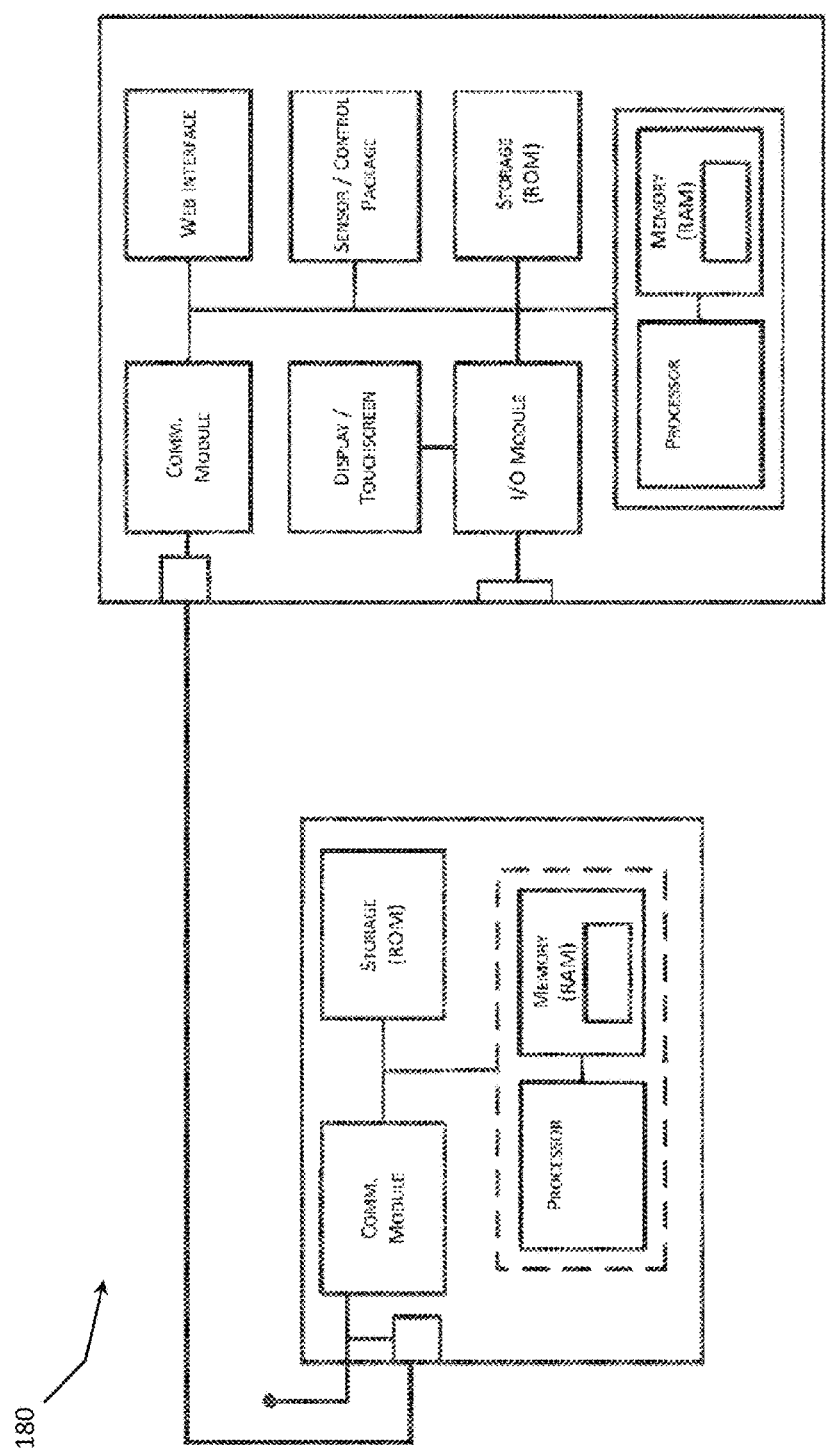
Figure 5A:
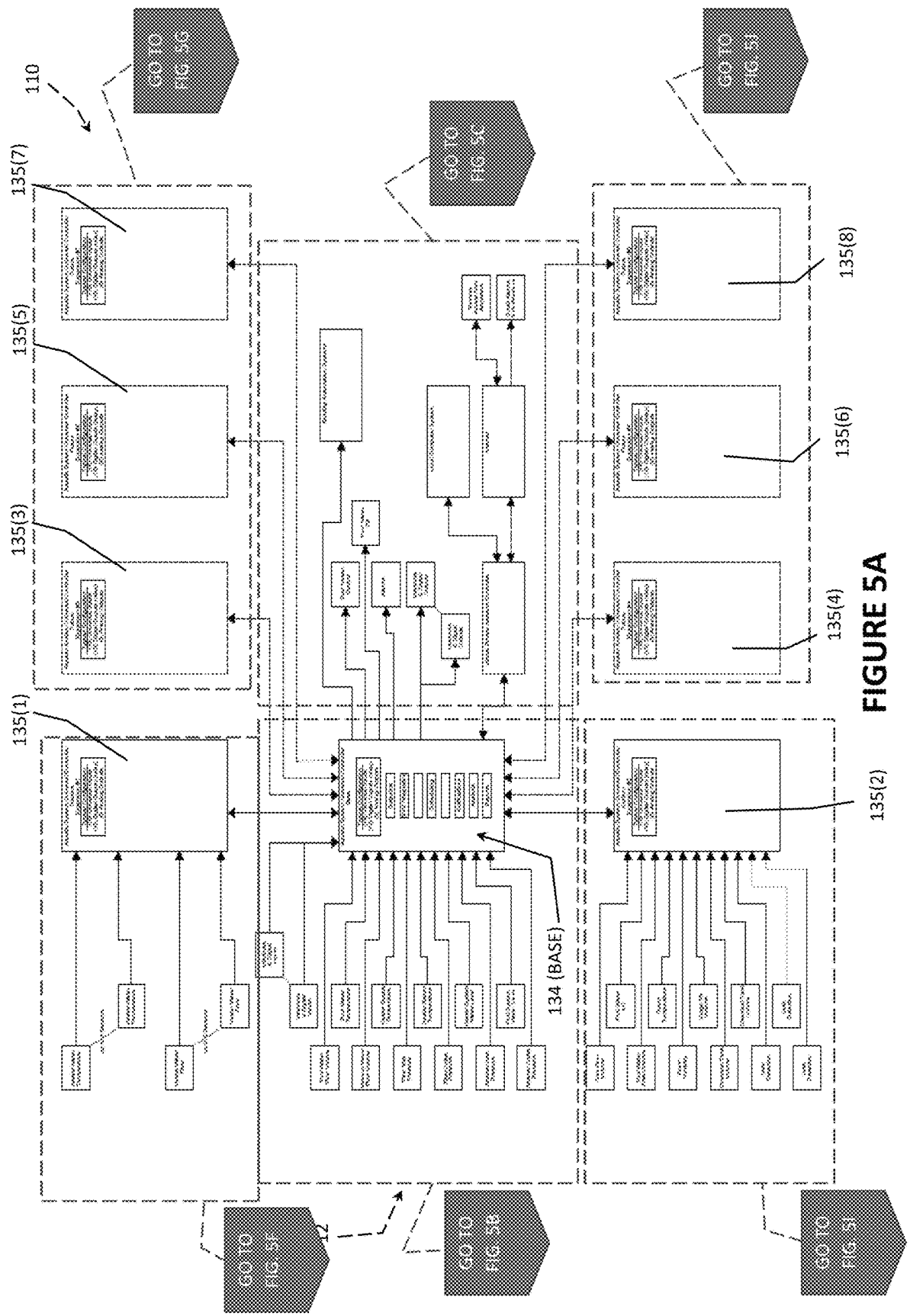

The controller is designed to be "modular" in the sense that as additional sensing groups are added to the system, a new page and corresponding programming are simply added to the controller. As indicated at FIGS. 3A and 5A, a feature of this embodiment is scalability/expandability. The base controller panel 134 has a maximum number of inputs and outputs. If more are needed, another panel 135 with another controller (e.g. Taco GLE-XM34IO), with a set of inputs and outputs, can be added. The additional controller does not need to have a display or computer. It can be communicated to the base controller 114 and/or computer 118 on the base controller panel 134 using a common protocol. As such, this technique balances the need for more inputs and outputs with the need to be practical economically and functionally. Adding an additional controller adds cost, but its ability to communicate to the base controller/computer/touchscreen reduces cost and complexity that would occur if the base controller panel 134 and all its components (including a computer) were fully replicated for each expansion panel 135.

Information on the graphical interface 113 is updated in real-time. As indicated above, the combination of design tools and the Web Page environment allow the base controller touchscreen display to be updated continuously in essentially real-time. It also gives the same advantage to any remote device 119.

The system is unique in the aspect that it built using a Building Automation System (BAS) format. See FIGS. 3A-13, 4A-C. As indicated above, an aquatic facility can include a variety of diverse subsystems, each of which must be monitoring and controlled. The diversity can include such things as variation in analog versus digital communications, the protocols of those communications, as well as what can be sensed to indicate operational state or status. Use of BAS informed format in this embodiment facilitates the technical solution of centralization of monitoring and control of such diversity.

Features include control and monitoring, trends, sending alarm notifications, remote monitoring and control, remote troubleshooting, remote modifications, owners manuals and service manuals stored on the controller PC, troubleshooting documentation appears on screen when there is an alarm or fault. In this embodiment, the combination of features provides subtle but important benefits for a universal, centralized, simplified technological solution to the issues that exist in the state of the art. Several are mentioned above. Adding an additional controller adds cost, but its ability to communicate to the base controller/computer/touchscreen reduces cost and complexity that would occur if the base controller panel and all its components (including a computer) were fully replicated for each expansion.

The system can be expanded to encompass almost any information that the end user wants to see. A subtle feature of scalability is that adding an additional controller adds cost, but its ability to communicate to the base controller/computer/touchscreen reduces cost and complexity that would occur if the base controller panel and all its components (including a computer) were fully replicated for each expansion. Another subtle scalability feature is that expandability of inputs and outputs gives the designer or facility owner the option of a wide variety of operational functions over and above basic water pumping. As indicated in FIGS. 5A-K, in this specific embodiment, the base controller panel 134 services water pumping, filtering, and straining, and some water temperature monitoring (see enlargement of the base controller panel 134 and the various sensors 121 and their functions at FIGS. 5B-C). Examples of specific commercially-available components are itemized at FIGS. 5D-E. Then, additional water heating functions are clustered at Expansion panel #1 (see 135(1) in the enlargement at FIGS. 5F-G- and parts list at FIG. 5H). Then, additional functions, including more water pumping, heating, and treatment functions are clustered at Expansion panel #2 (see 135(2) in the enlargement at FIGS. 5I-J and parts list at FIG. 5K).

Figure 5B:
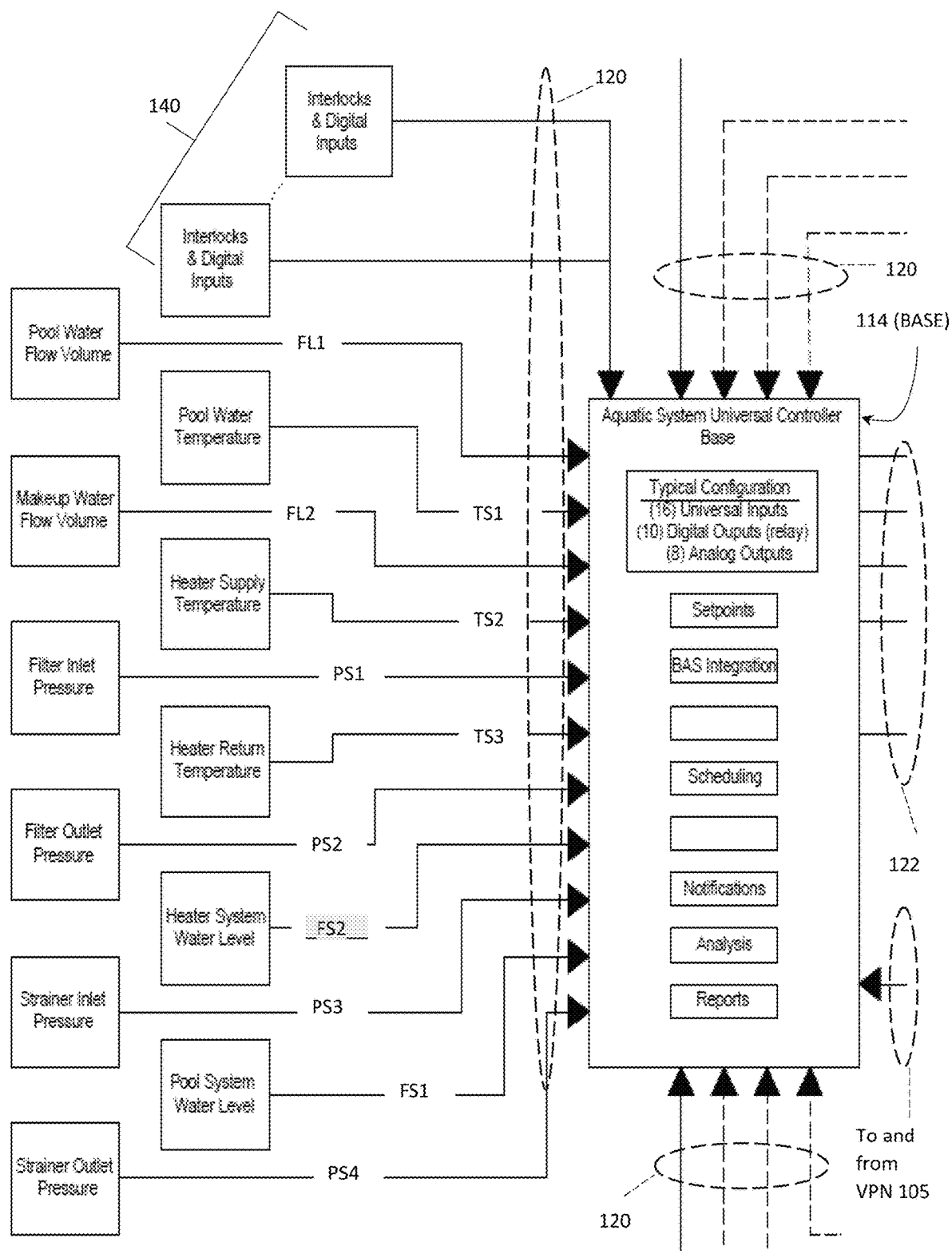
Figure 5C:
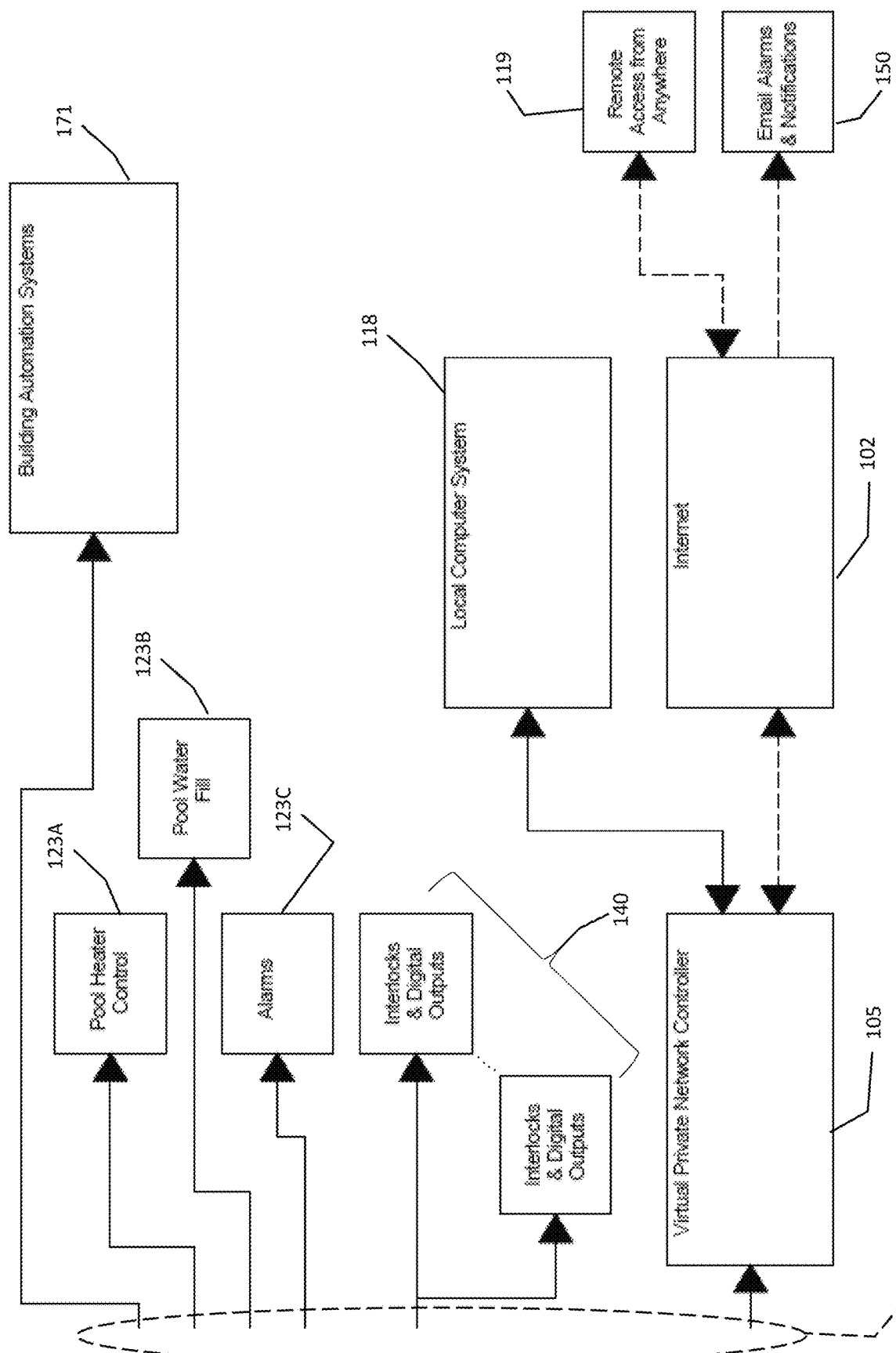
Figure 5F:
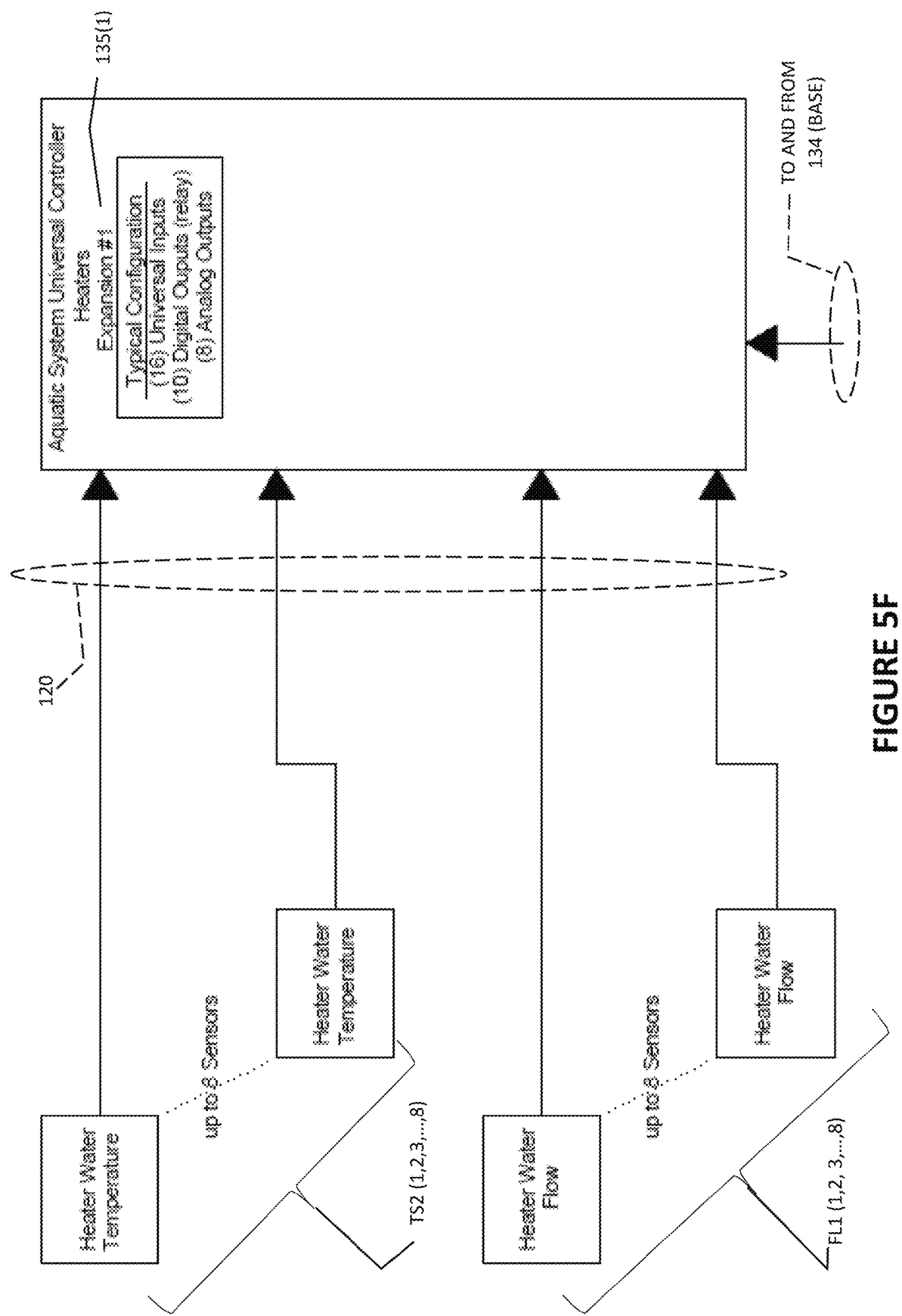
Figure 5G:
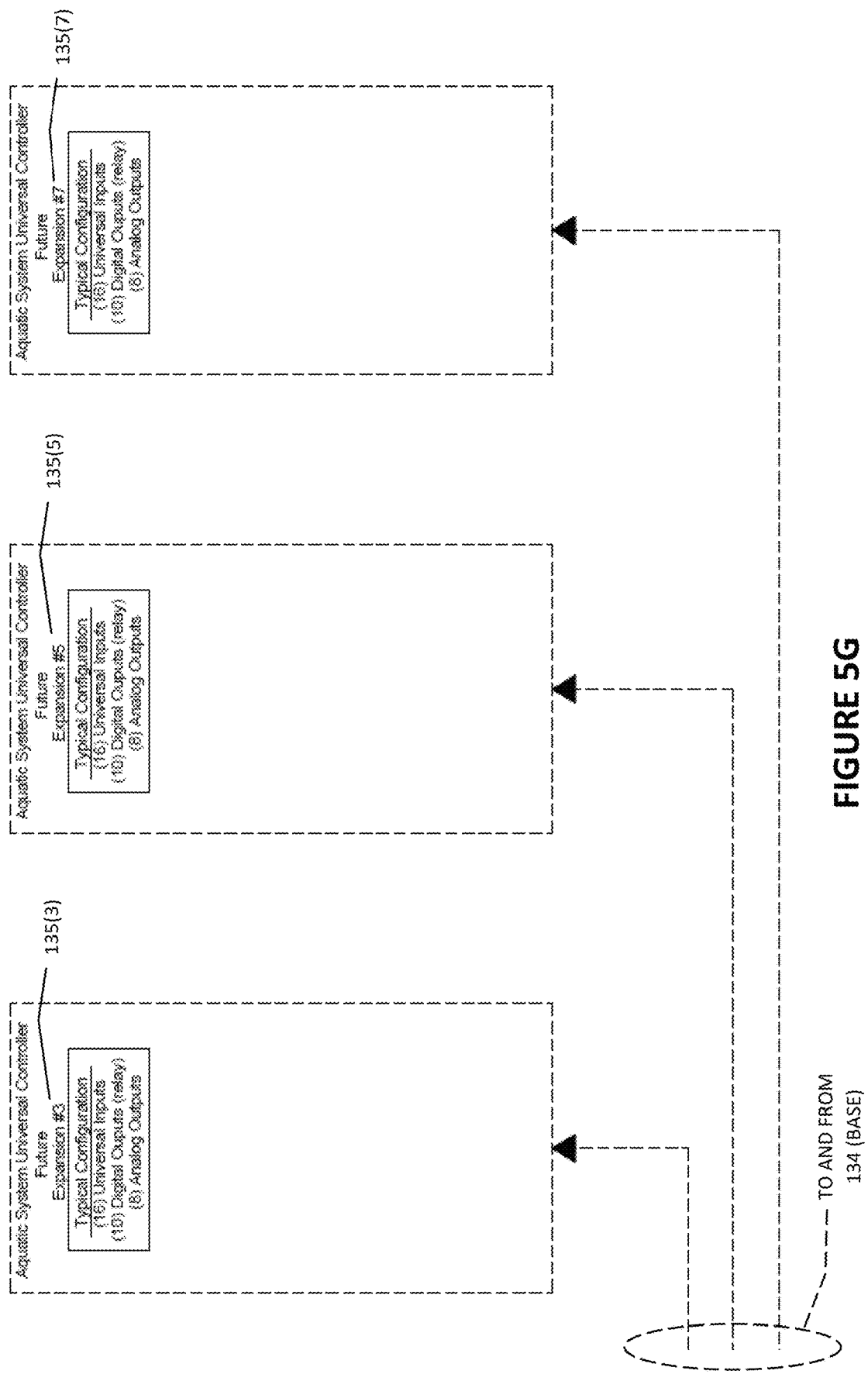

For example, outputs to pool heater control 123A, poll water fill control 123B, and alarms 123C are shown in FIG. 5C and are non-limiting examples. The designer or owner/operator of system 100 has significant options and flexibility because of expandability, universal inputs, a variety of outputs, and common protocols, as discussed herein.

From the basic monitoring and control of an aquatic system, this embodiment can be expanded to include more detailed information about the system. Non-limiting examples are as follows. Its capabilities can include efficiency and costs analysis. It can also display local weather information. As will be appreciated by those skilled in this technical field, the adaptability and flexibility of this system allows any number of additional inputs, outputs, or information according to need or desire.

Note that some functions provide information beyond water pumping, heating, and treatment. Examples include interlocks and digital inputs 140 (FIGS. 5B-C). Such interlocks could, for example, related to a setting that overrides a default setting or a setting that requires one or more conditions to be satisfied before a function operates. Most times this is a configurable setting. One non-limiting example is that if the pool pump is disabled, the chemical feed equipment will also be disabled, avoiding development of chlorine as in the lines. This can require putting the circulation pump an d chemical feed equipment on the same electrical circuit or installing an interlock safety switch.

Figure 5I:
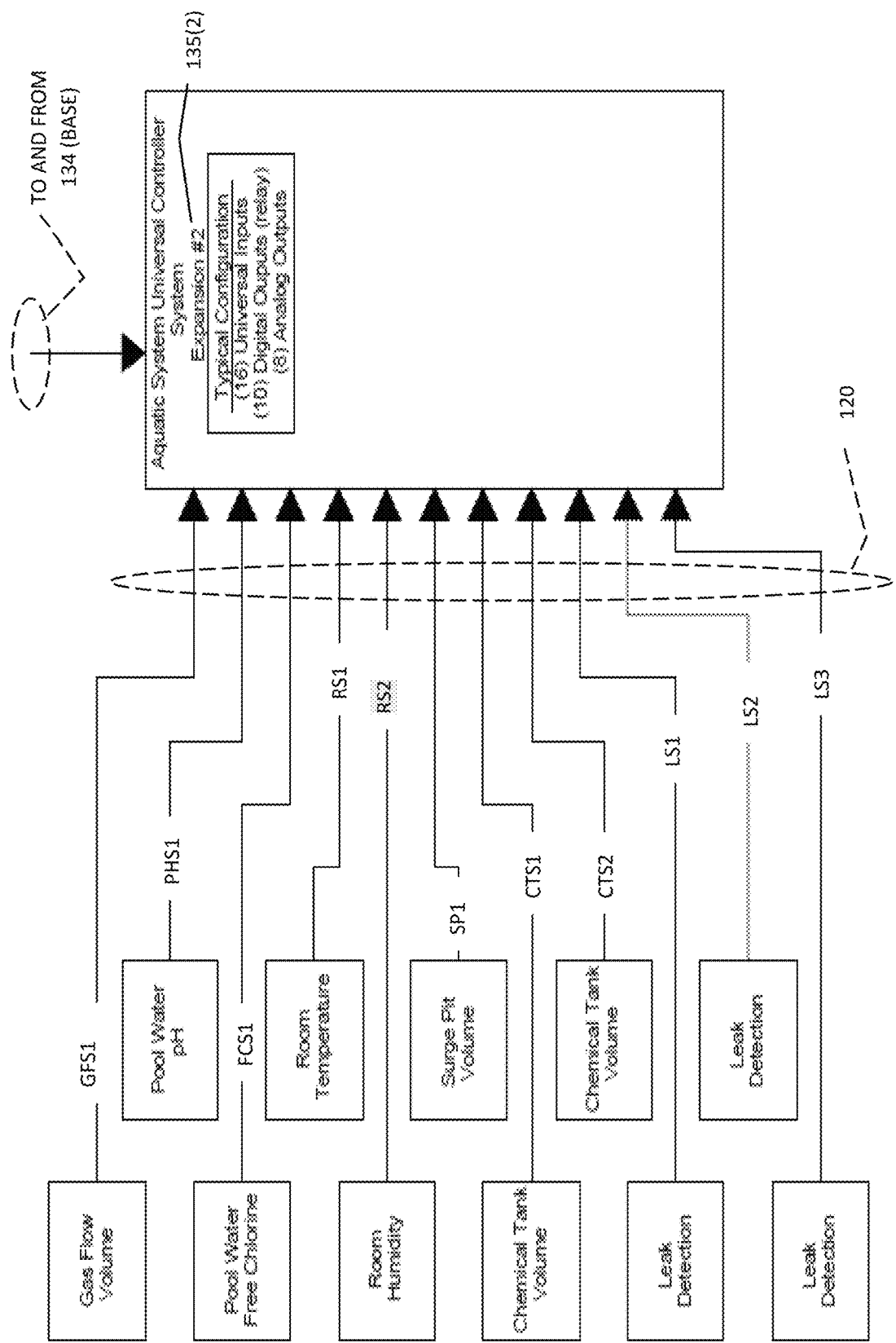
Figure 5J:
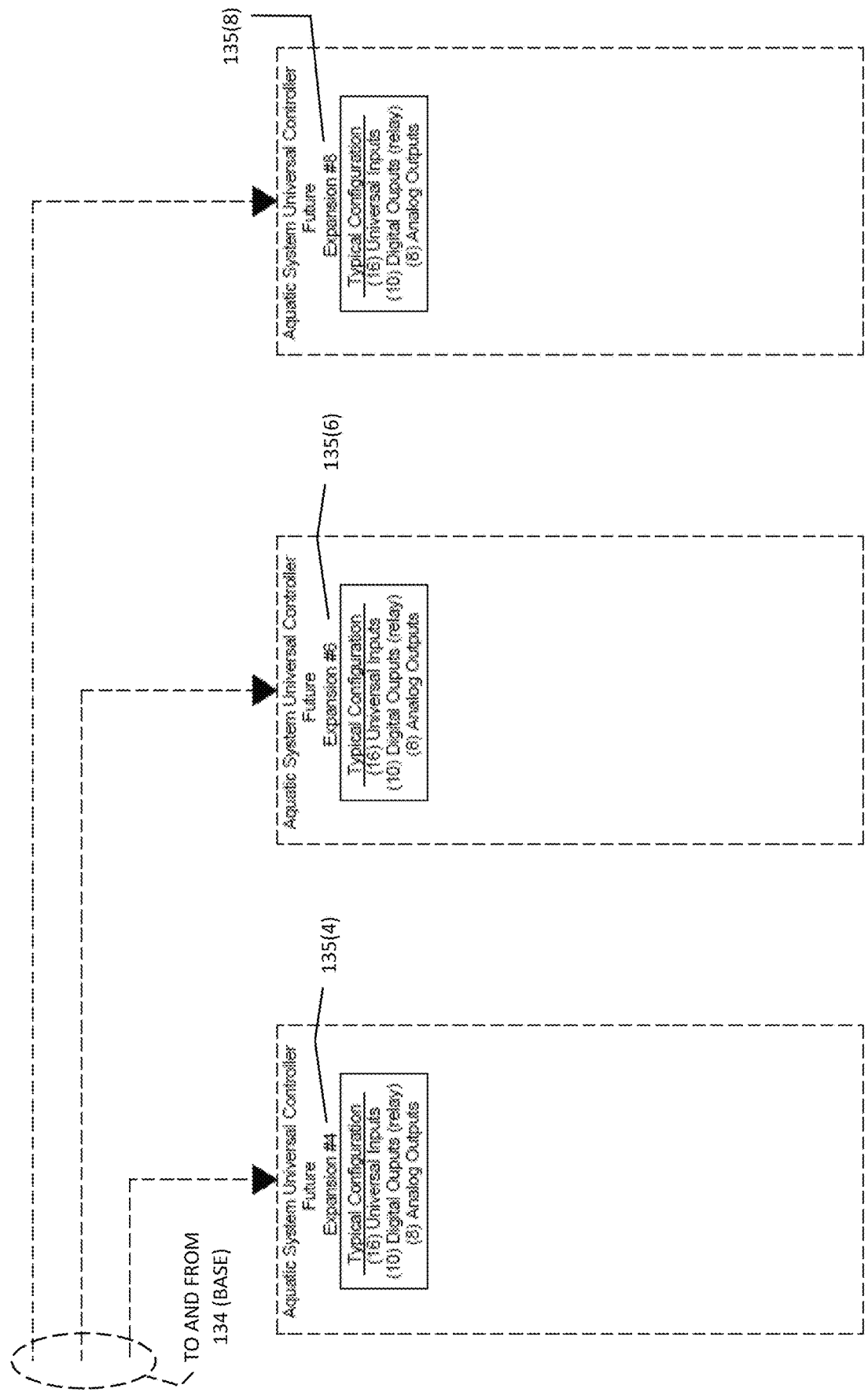

Others are room humidity and temperature (FIG. 5I). This type of information can be used in a variety of ways. One is to inform control of operations to response to changes in those values. Another is to allow a comparison of how the subsystems have operated relative to those values. For example, such comparisons can show where setpoints are too broad or too narrow for efficient operations and allow an operator to reconfigure the system for better operation. A still further example of additional information is leak detection (FIG. 5I). Utilizing moisture sensors (or other types of sensors), the system could monitor areas for presence of water indicative of a leak of the water basis, the water supply lines, pumps, or other equipment. If such a condition is sensed, an alarm or notification can automatically be sent to the base controller and indicated on the touchscreen and/or communicated to a remote device. Another option would be a text message or email to such a remote device (or to a pre-authorized smart phone number or email account). As will be appreciated, the ability to expand with a common communication protocol to a centralized system provides the system designer with much flexibility and versatility. The expansion via plural (1-$n$) expansion panels 135(1)-($n$) (FIG. 5A) gives high capabilities in this area. Some aquatic facilities want just basic functions/features. Others might want a large number of functions/features over and above basic ones.

Expansion modules 135 can be added to the base controller 114 to increase the monitoring and control. In this example, a combination of up to 306 points (analog and/or digital inputs/outputs) can be monitored and controlled from one Base Controller. As indicated above, scalability/expandability is made efficient and effective with this embodiment. For the particular components itemized, several hundred inputs/outputs can be serviced. This allows great flexibility in design. As will be appreciated, more or less total points are possible based primarily on the components selected for use.

3. Parameters Monitored/Operations Controlled

In this specific embodiment, the following monitor/control points are made available in the design of the system. As will be appreciated, these can vary according to need or desire. But this set is illustrative of a set up that goes somewhat beyond basic functions. FIGS. 5A-K show how these features might be configured in the context of a base controller panel and several expansion panels.

Aquatic System Universal Controller

Monitor and/or Control

1. Pool Water Temperature
2. Pool Heater System Supply Water Temperature
3. Pool Heater System Return Water Temperature
4. Individual Heater Water Temperatures
5. Room Temperature
6. Room Humidity
7. Building Air intake Temperature
8. Building Air Exhaust Temperature
9. Outdoor Temperature
10. Outdoor Humidity
11. Water Flow to Pools
12. Water Flow through Heaters
13. Water Flow—Makeup Water
14. Effluent Pool Filter Pressure (output)
15. Influent Pool Filter Pressure (input)
16. Effluent Strainer Pressure (output)
17. Influent Strainer Pressure (input)
18. Pool Water Level
19. Heater Water Level
20. Water pH
21. Water Chlorine
22. Chemical Tank Levels
23. Moisture Sensors in Dry Areas (leak monitoring)
24. Filters
25. UV System
26. Alarms
27. Trending As will be appreciated by those skilled in this technical field, the foregoing can vary according to need or desire. The system of this embodiment effectively and efficiently accommodates the same.

4. System Capability Overview

As indicated above, in this embodiment a subtle feature is to have universal inputs and sets of analog and digital outputs. This provides built-in flexibility to the designer. It allows freedom regarding selection of the components that will provide the inputs and components that receive the outputs from the base controller. This can not only provide the designer flexibility but also could result in a reduction in capital or operating costs because certain components (sensors, pumps, heaters, etc.) could be used that are cheaper or more energy efficient.

Below is an example of one set of design selections that is possible with this feature:
 1. System Water Temperature Monitoring and Control
   a. Pool Temp Analog Input (A)
   b. Supply Temp Analog Input (A)

c. Return Temp Analog Input (A)
   d. Run Output (A)
 2. Heater System Monitoring and Control
   a. Individual Heater Temps Inputs (B)
   b. Individual Pump Amperes Inputs (B)
   c. System Water Level Digital Input (A)
 3. Gas usage
   a. Gas Flow Input (C)
 4. Runtimes
 5. Water Pump(s) Monitoring and Control
 6. Current (ampere) draw
   a. Current Input (A)
 7. Flow rates
   a. Flow Input (C)
 8. Filter/Strainer Monitoring and Control
 9. Pressure monitoring
   a. Pressure Inputs (4) (A)
10. ORP/pH System Monitoring
11. Water chemistry
   a. pH Sensor Input (C)
   b. Chlorine Sensor Input (C)
12. UV System Monitoring
   a. UV Digital Input (C)
13. Water Level Monitoring and Control
14. Pool Level Monitoring and Control
   a. Pool Water Level Analog Input (A)
15. Surge Pit Monitoring and Control
   a. Surge Pit Water Level Analog Input (C)
16. Makeup Water Fill Monitoring and Control
   a. Flow Sensor Analog Input (A)
   b. Water Fill Valve Output (A)
17. Chemical Storage Level Monitoring
   a. Level Sensor Analog Inputs (C)
18. Manning Notification
19. Visual/audible
20. Email/text
21. Historical and Trending Data Presentation
22. Air Temperature and Humidity Monitoring
   a. Analog Inputs (2) (C)
23. Leak Detection
24. Moisture detection in dry areas
   a. Analog Inputs (2) (C)
25. BAS (Building Automation System) integration
26. User specific accessibility to sensitive controls
27. 24 inputs plus individual heaters and currents (16 available per unit)
28. Basic System (11)
29. Heater System Individual Monitoring (16)
30. Extended System (13)

As will be appreciated by those skilled in this technical field, the foregoing are non-limiting examples. Variations are, of course possible, according to design need or desire. That is one of the advantages of the embodiment.

5. Operation

With particular reference to FIGS. 6A-E and 7A-E, an example of how the specific embodiment would be operated is set forth. It takes advantage of the scalability of the system, as discussed above, as well as the web page based content delivery. FIGS. 6A-E and 7A-E are non-limiting examples of graphic content 112 that could be displayed on touchscreen 112 and/or any permitted remote device 119. These examples show how the subtle combinations of graphics, animations, alpha-numeric information, and other displayable content can promote effective and efficient monitoring and control In this example, the following parameters are monitoring or controlled. These, of course, can vary according to need or desire:
 Monitor and/or Control
 Pool Water Temperature
 Pool Heater System Supply Water Temperature
 Pool Heater System Return Water Temperature
 Individual Heater Water Temperatures
 Room Temperature
 Room Humidity
 Building Air intake Temperature
 Building Air Exhaust Temperature
 Outdoor Temperature
 Outdoor Humidity
 Water Flow to Pools
 Water Flow through Heaters
 Water Flow—Makeup Water
 Effluent Pool Filter Pressure (output)
 influent Pool Filter Pressure (input)
 Effluent Strainer Pressure (output)
 Influent Strainer Pressure (input)
 Pool Water Level
 Heater Water Level
 Water pH
 Water Chlorine
 Chemical Tank Levels
 Moisture Sensors in Dry Areas (leak monitoring)
 Filters
 UV System
 Alarms
 Trending FIG. 6A shows the main page, so to speak, of this exemplary embodiment of the invention. This main page 200 is content 113 that would be viewable on the base controller touchscreen 112 or any permitted remote device 119. It is to be understood that main page 200 can have a variety of visually perceivable information. In this example at FIG. 6A there are simulation renderings of pool basin 12', heater 28' of water heating subsystem 124', water pumps for both water heating system 124' and water supply subsystem 126', a filter 231 associated with water filtering/straining subsystems, and a water treatment component of water treatment subsystem 127'. These can be made as realistic or as diagrammatic as desired. For example, digital images of the exact model and make of components can be used, but it is not required. Similarly, if desired the precise or close to precise form factor of the actual pool basis of the particular aquatic facility can be displayed, including a digital picture, but more diagrammatic renderings can also be used.

As further indicated at main page 200, the relative arrangement and interconnections between components and sub-systems can be displayed. One example is the water piping. In this embodiment, water pipe sections 201A, B, C, and D from heater subsystem 124' show connection to subsystem 127'. Furthermore, they are colored to indicate at least generally a relative water temperature in those sections; here RED indicative of hotter, which is intended to indicate it is at a good temperature (within operating setpoints) from the heater. This allows a user to immediately visually confirm the same. As indicated, animation could also add other characteristics (e.g. graphic simulation of water flowing in the appropriate direction in those pipe sections). Other pipe sections 202A, B, C, D, and E can similarly show visually perceivable indications of operation (e.g. color, here blue to distinguish from water from the heater in pipe sections 201A-D, water flow animation, or other. Other features of this main page 200 will be discussed infra.

a. Operations

Upon powering up, login into the system as the Administrator with the supplied "User" and "Password". See, e.g., FIG. 2D. NOTE: Only the Administrator has access to the Configuration Setup Screens. See, e.g., FIG. 2E for example of authentication techniques that would allow different permissions to different users of the system. As mentioned, another permission level would not allow access to configuration/reconfiguration functions.

b. FIGS. 6A-E Configuration/Set Up (1) FIG. 6A

An administrator that has obtained access (e.g. installer, facility owner, etc.) would initialize the system via a set of configuration options. In this example, the administrator would press the "CONFIG" button 210, FIG. 6A, to navigate to any of the Configuration Setup Screens 220, 230, 240, or 250. As shown, the administrator would first have the ability to see a graphic rendering on the large touchscreen of the system, as well as the subsystems, quantified information, and state/status indicators that will be provided in the home display 200. As can be seen, the HMI touchscreen display provides a visual snapshot of system operations, including real time quantifications, states/status, and animated rendered modeling of the specific configuration of the aquatic facility.

This display 200 therefore is simplified, centralized, real-time, system-specific operations monitoring and control based on the simplified, centralized scalable hardware. Moreover, this display provides an integrated, helpful, visualization of not only if the subsystems are running within setpoints or other parameter settings, but also gives quantified information, historical information, and ancillary information that can be useful to understand proper operation of such a facility. Examples are status indicator lights (e.g. green=good; other colors indicate other than good), animations (e.g. flowing water and/or water temperature—red=hotter, blue=cooler). The designer can create such animations as are desired or needed.

Thus, the combination of the embodiment provides not only the ability for such flexible, scalable operations monitoring, but also its effective continuously updated visualization at the touchscreen display of sufficient size to allow effective visual resolution of all this information.

As will be appreciated by those skilled in this technical field, variations to the why, the content, and the colorings/animations or other graphic features can vary according to need or desire. Importantly, the combination allows both sufficient and detailed information about system operations, it does so for understanding by a range of users, including highly technical and experienced (e.g. managers, engineers, and the like) as well as less technical or experienced (e.g. pool employees, facility personnel, and the like).

As indicated, the display 200 of FIG. 6A includes the "configuration" button 210. This can be selected if: (a) an initial set-up configuration is needed, (b) a change to a previous configuration is needed, or (c) a review of a present configuration is desired.

If enabled, the system can include protection against unauthorized change in the configuration. One example, as mentioned, is once the "config" button 210 is selected, an authentication screen (see FIG. 20) be presented at the display. It would require at least single step/feature authentication before any changes to the configuration were allowed.

Below are examples of types of configuration settings in this specific embodiment.

(2) FIG. 6B

At initialization, the Temperature Alarms associated with any of temperatures sensed by temperature sensors in FIGS. 5A-K will have a default value entered. An authorized/permitted user 101 can review those defaults and consult instructions, references, or other information, and based on those (or training/experience) decide to leave them in place or change them. In the present embodiment, at least pool water temperature (see "Pool Setpoint" at ref. no. 203 in FIG. 6A) might be able to be quickly adjusted right from main page 200 (by users given permissions to do so according to the system) (here by minus and plus buttons on opposite sides of the displayed set point of "88.0° F."). Actual current sensed pool temperature (here for example "89.7° F.") is displayed in close proximity.

To illustrate features of this embodiment, this example highlights "88.0° F." in red to give an immediate visual distinction of setpoint from actual pool temperature (displayed in green background). This can deter misunderstanding or unneeded configuration changes.

In this embodiment, reconfiguration or configuration changes can also be made by selecting one of the buttons 220, 230, 240, or 250 on main page 200, depending what the permitted user wants to change. Button 220 would take the user to a different displayed content page, here page 211 of FIG. 6B.

Page 211 displays more information related to temperature setpoints. Any changes can be efficiently accomplished by touchscreen operation. Here, any adjustment of the Temperature Alarm Setpoints as needed for the current system can be quickly and easily done using the [+] and [−] buttons of FIG. 6B. Of course, other HMI techniques of user-entry of values or user-selection of choices/changes are possible. A few non-limiting examples include via a virtual keyboard, a slider control, or a virtual dial.

Navigation to other settings can be from the touchscreen. Here, when finished with any changes on this page 211, the user can press the "PAGE 2" button to proceed.

(3) FIG. 6C

As shown in page 212 of FIG. 6C, in a similar fashion default settings for a preprogrammed set of filter and strainer setpoints/parameter settings/sensor readings can be reviewed and, if authorized, changed. For example, these Pressure Alarms will have a default value entered. Adjustment of the Pressure Alarm Setpoints can be as needed for the current system using the [+] and [−] buttons. When finished, press the "PAGE 3" button to proceed.

(4) FIG. 6D

FIG. 6D illustrates similar configuration paradigm for a page 213 and the following.

The Flow Alarms will have a default value entered. Adjust the Flow Alarm Setpoints as needed for the current system using the [+] and [−] buttons. As will be appreciated, flow sensors can be used to directly or indirectly sense certain operating conditions. For example, flow sensing can directly measure water supply to the water basin. Calculations based on known or empirical data can be used by the system to decide if the water flow is within desired operating range or outside it. If not, an alarm or notification can be automatically generated either visually on the touchscreen display, an audible alarm (e.g. through computer speakers or otherwise, or via text or email). For remote devices, the same can apply. Flow sensing can indirectly indicate some blockage or need for maintenance such as with filters or strainers.

As mentioned above, additional information about system operations can be collected and stored by the system. For example, as illustrated in FIG. 6D, the screen 213 shows how much water was needed for the immediately preceding "Pool Fill". It can include date/time information of that last fill. This can be beneficial to see for a variety of reasons. Some include the ability to know a quantified water usage, the ability to discern if the last fill seems excessive, or otherwise compare that data with other information. The "Heater Pump Runtime" display allows such things as to see a quantified runtime, the ability to discern if it is excessive, and thus indirectly, the ability to discern inefficiencies in energy usage or possible need for maintenance or repair.

As indicated, the authorized user could press the "Reset" buttons to clear any accumulated Runtime Data. When finished, press the "PAGE 4" button to proceed.

(5) FIG. 6E

As shown at page 214, an authorized person can supply email address(es) for notifications/alarms. This provides a 24 hour/7 days a week ability of the system to automatically send notifications to designated persons. This can greatly benefit and enhance system operations by allowing immediate notification to any email designated of an alarm condition. Of course, other automatic outside-of-system notifications are possible. Examples include text messages or automated telephone (cellular or landline) calls. Configuration information about who and what medium to use could be entered in a similar manner if the system allows such modes of communication.

During original configuration of the system, an authorized user can edit the Email addresses accordingly—here the user must make sure to hit "Enter" to write the changes to the database. The changes will appear in the "current configuration" fields Press the "DONE" button to exit the Configuration Setup Screens.

(6) FIG. 6A

Once Configuration is complete, the authorized user can logout of the system. Login into the system again can be as a Manager (or other authorized/permitted person) with correct authentication (e.g. the supplied "User" and "Password" in this example).

Again, if different permission levels are enabled, the configuration screens could allow a person authorized to enter the identification of persons permitted to just view the information on the main display 200 of FIG. 6A (or FIG. 7A) but not change the configuration settings. There could be, if desired, input of email, text, or phone number for notifications to such persons. In this example, only managers/authorized authenticated persons are allowed to change configuration settings.

c. Operation

Once initially configured by an authorized user, monitoring can proceed. FIGS. 7A-E give examples possible with the specific embodiment.

(1) FIG. 7A

The "Pool System" screen 200 (FIG. 7A) displays information from all aspects of the system of the specific embodiment. For example, status indicators 251 (see FIG. 6A) will show whether there are any issues with the individual heaters or any other aspects of the system that are being monitored. In FIG. 7A that could include virtual status lights (e.g. green=OK for "Heater Water Level") or quantified values (e.g. blue is OK for "Delta T" (offset between Return T and Supply T), "Return T" (temperature of water returning to the heater from the water basis), and Supply T (temperature leaving the heater to go to the water basin). See area of main screen 200 at ref. no. 221 of FIG. 6A. Additional non-limiting examples are at ref. nos. 222, 223, and 241 of FIG. 6A, e.g., combinations of color, animation, quantified information, historical information, trending, status (present and past), labels, renderings, and the like.

The basic/base controller 114 in this embodiment will be able to control a system with up to 8 individual heaters. This system will monitor and control the pool temperature, system temperature, system water level, and the individual heaters. Specifically, the base controller can be preprogrammed to automatically attempt to regulate operations of the subsystems to keep operating conditions within range of the configuration set points/parameters. As such, it automatically can issue instructions to actuators (valves, pumps, heaters, chemical injectors, etc.) the subsystems to dynamically operate accordingly. The monitoring provides feedback or data for the controller to perform such regulating activities. And, then, the monitoring also can detect/sense a parameter indicative of operation going out of range or above or below a configured set point and automatically generate a notification of the same by a change in the display of FIG. 7A and/or an out-of-system communication (e.g. email or text).

Again, the relatively large, relatively high resolution, visualization-rich main display is enabled by the interoperability of the other aspects of the system. The ability to render a facility-specific representation of the relevant operations, the ability to render color, object, status visualizations, and the ability to include quantifications, historical information, and ancillary information; all founded in the scalable/expandable inputs/outputs; is a balancing of the many and sometimes antagonistic factors related to monitoring and control of such aquatic systems.

The system is expandable in order to accommodate as many heaters as are required to heat the aquatic system. Similarly, other inputs and outputs can be added according to need or desire.

In addition, non-limiting examples of how the system can be expanded to monitor and control additional aspects of the system include:
  Pressures to determine filter and/or strainer status
  Water chemistry including pH and free chlorine
  UV system status
  Water levels
  (see below for a complete list of monitoring and control features)

The system uses animated graphics that are displayed on a 15" touchscreen 112 to show the flow of water through the system as well as system status. In addition, the system can be viewed remotely and can send alerts via email.

FIG. 7A illustrates another feature of this embodiment. The display 200 of FIG. 7A has a snap-shot of system operation. The user can drill-down to more detail. See the navigation buttons on the left lower side of FIG. 7A. Examples of how this feature work are discussed below.

If the main "Pool Screen" 200 of FIG. 7A indicated any issue with the heater system, the "Heater System" screen

Figure 7B:
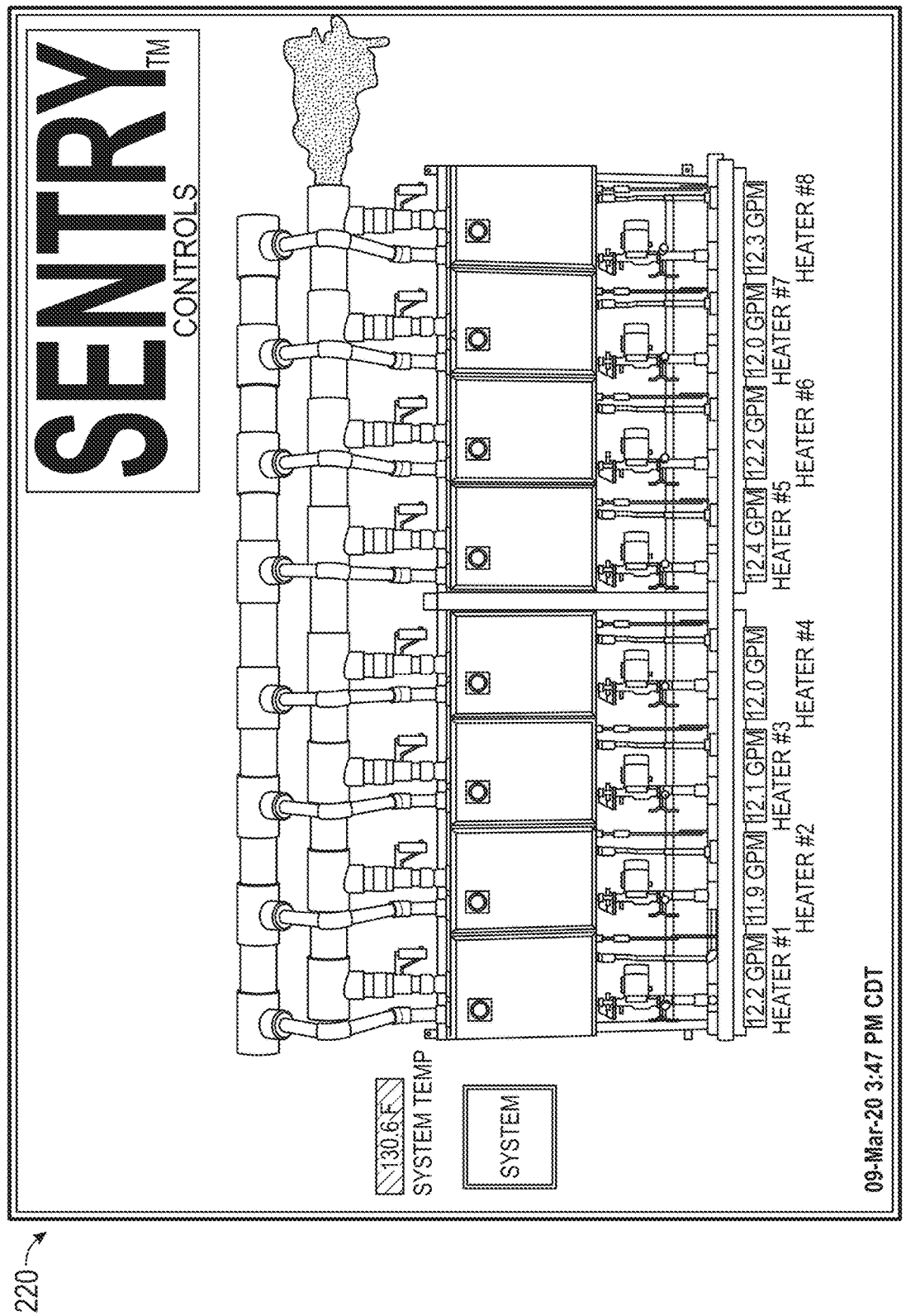

220 of FIG. 7B can be used to further troubleshoot by pushing on the touchscreen the "Heaters" navigation button.

(1) FIG. 7B

The screen 220 of FIG. 7B would appear. This "Heater System" screen displays information from the individual heaters, as well as the complete system (see annotations on FIG. 7B). This information can be helpful in determining if an individual heater or pump needs service or maintenance.

As indicated in FIG. 7B, development tools can be used by the system designer to create a visual rendering or model of the heaters. It can include added information like animations, status/state indicators, quantification data or information, color-coded status, date/time stamp, etc., related to the heating subsystem and operation. to the main display.

Such can be helpful in analyzing operation of the heating subsystem. The user can navigate back to the main screen with the "SYSTEM" button. The user can then decide, if authorized, to go the configuration screens and make changes or not, as described above.

(1) FIG. 7C

Figure 7C:
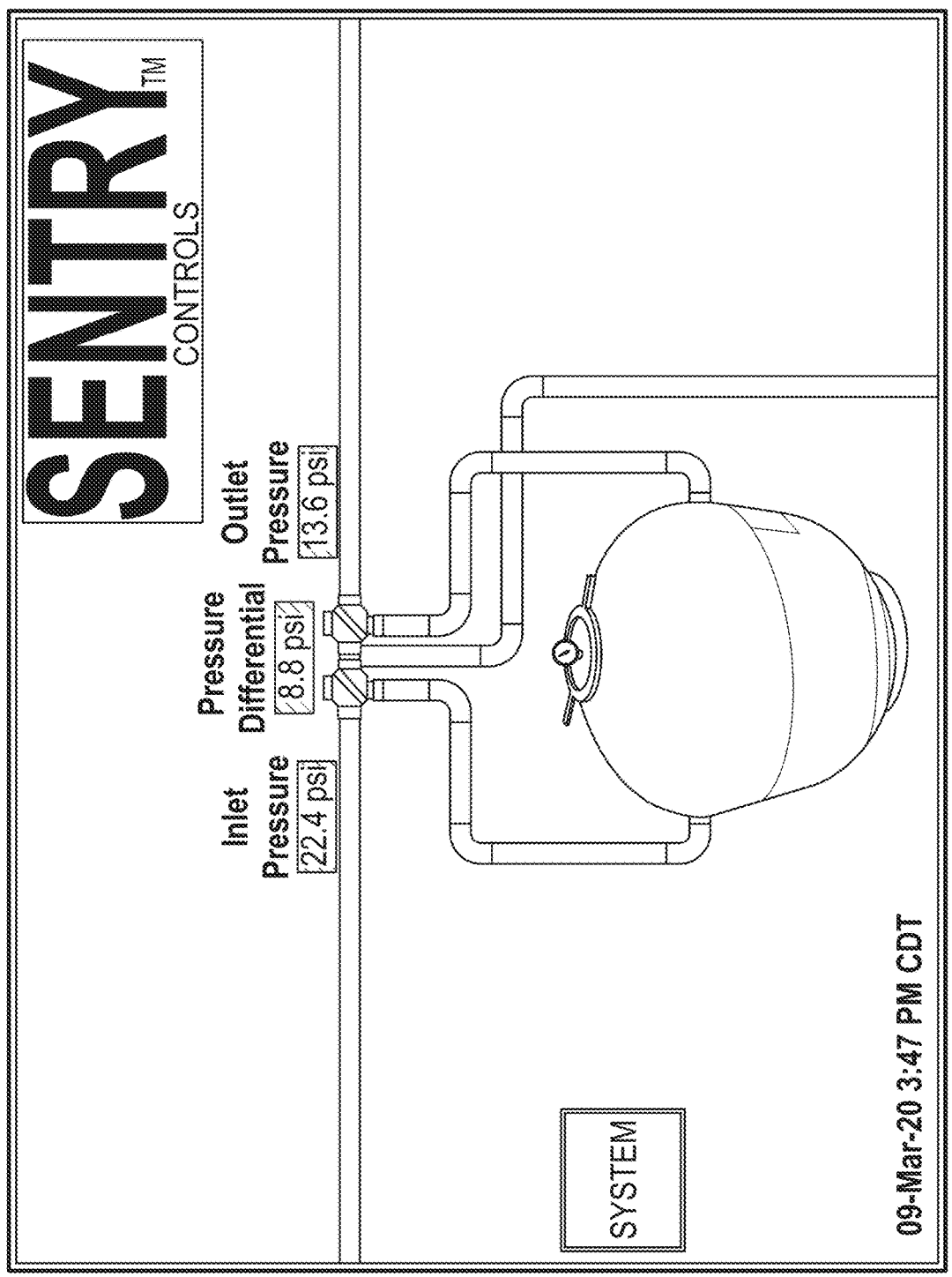

By way of another example, if the "FILTER" navigation button in FIG. 7A is pushed, a screen 230 such as FIG. 7C appears. As annotated, this would allow a drill-down or more or different information specific to the filter subsystem, including animations, status and quantifications, etc.

If the main "Pool Screen" (FIG. 7A) indicated any issue with the filter system, the "Filter System" screen 230 can be used to further troubleshoot. The "Filter System" screen displays information about the filtering system. This information can be helpful in determining if a filter is becoming plugged and needs service or maintenance.

(2) FIG. 7D

Figure 7D:
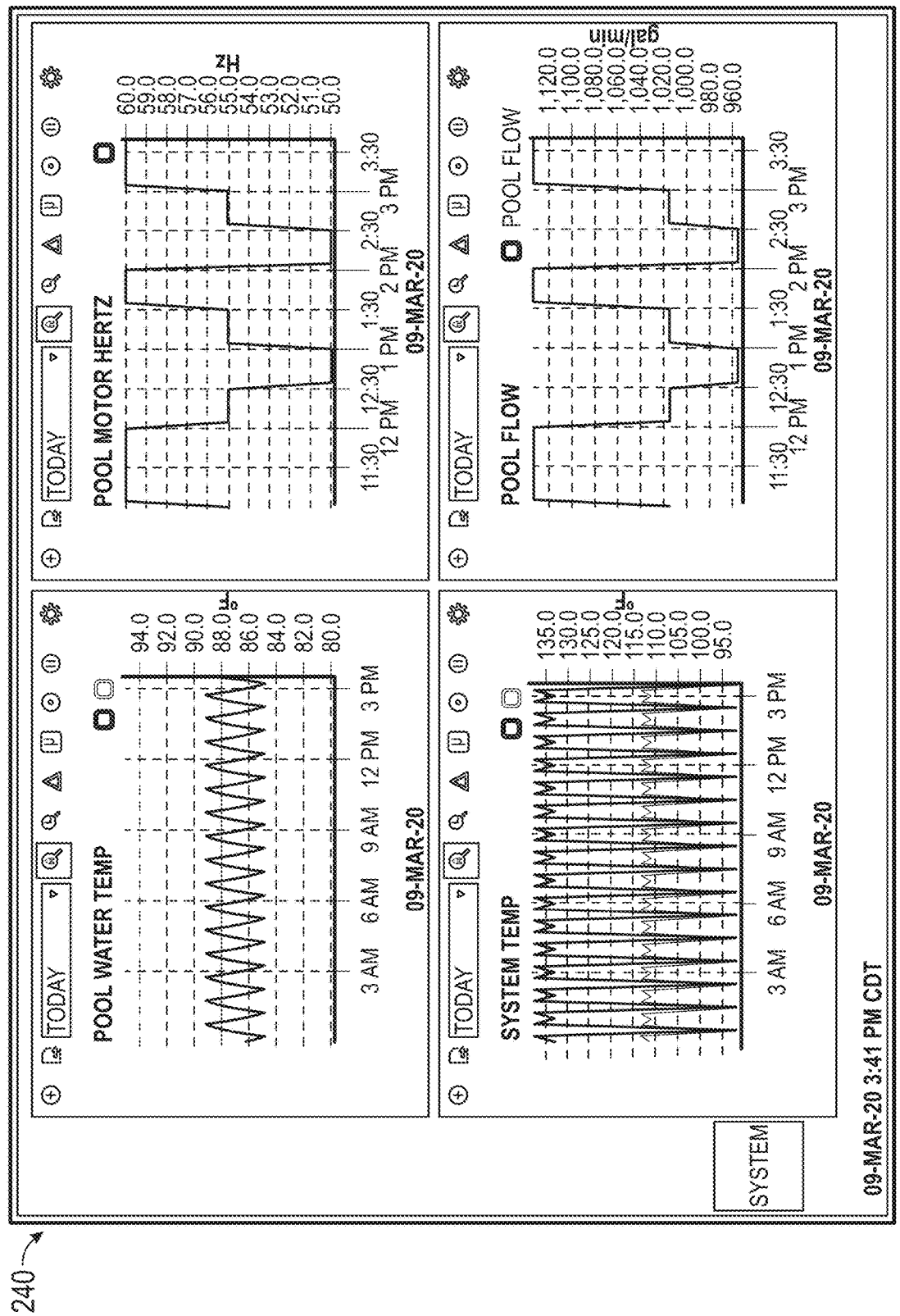

A further example is given at FIG. 7D. As mentioned previously, the capabilities of the base controller 114 and/or its computer allow digital storage of a substantial amount of operational data of the system. Whether on-board magnetic or solid-state digital storage medium(s), or cloud-based, even relatively large amounts of data obtained by the system over days, weeks, or even month and years could be stored relatively economically. This provides a subtle but important benefit. It allows any number of uses of stored data. FIG. 7D shows a few. The Pool Water Temp graph of screen 240 of FIG. 7D allows visualization of preceding versus present operation of the system to try to maintain water basin water temperature within set points or within an acceptable offset from a target temperature. As can be seen in this example at FIG. 7D, a target goal or setpoint of 88° F. is displayed relative to sensed temperature over a preceding 12 hours. This example would indicate likely acceptable operation. The sensed temperature consistently hovers around the set point, indicating typical within-acceptable-range temperature drop but system operation to automatically actuate heaters to restore to at or near the set point temperature. If the sawtooth line was not consistent and/or did not routinely restore water temperature, it could be indicative of need for action/change/repair.

The "Historical Data" screen 240 gives a graphic representation of the system performance. This information is configurable as to the time frame that is being displayed.

Pool Motor Hertz graphing can similarly visually and quickly indicate normal or acceptable pump motor operation. Quantification along the Y-axis is additional information to help inform the user. As will be appreciated, a subtle but beneficial aspect of these types of graphs can also indicate efficiency issues. For example, if Pool Motor Hertz curve deviates from a normal expected curve, it could indicate not only a possible malfunction/need for maintenance or repair. But by comparison with published or empirical data, even a slight deviation could be indicative of the start or trend towards loss of efficiency, malfunction, or even failure or end of normal useful life of the motor. This ability to utilize trending information can be valuable in catching need for maintenance, repair, or replacement early for planning and to avoid catastrophic failure.

The other graphs (System Temp and Pool Flow) can be used in similar ways. As will be appreciated, this type of data could be captured, stored, and utilized in similar ways for any and all of the components or parameters of the system, if desired. The designer can program which data is captured, which is displayed, which is stored, and which (and how) is retrieved and processed into information such as the non-limiting examples of FIG. 7D.

(3) FIG. 7E

Historical retention of such things as alarms or notifications is illustrated at FIG. 7E. This can be used not only for a summary of frequency of alarms and for what components/parameters, but also for record-keeping regarding system operations. This can be beneficial for mining such data for insights regarding possible recurring events that can be improved by change in system configuration, change in one or more components, etc. It also can be beneficial for warranty purposes or prediction of need for repair, replacement, or other actions.

As shown, the information screen can include software tools to help the user to evaluate such data. See the buttons at the bottom.

The "Alarms" screen 250 gives a list of all unacknowledged alarms. This information can be helpful in determining where service or maintenance is needed. It can also be helpful in determining the time frame for a system failure.

In the example of FIG. 7E, a variety of visual indications can be used to help a user quickly; accurately, and comprehensively understand alarm status. Here a current alarm is displayed in RED to indicate an alarm condition (e.g. one that is displayed on main page 200 and/or generates a notification (e.g. text or email). The "previous alarms" on FIG. 7E are in GREEN color to differentiate. For example, GREEN could simply mean they are prior to "current alarm" (and thus not as relevant to current operations). Alternatively, GREEN color could mean they have been resolved (e.g. some change made or a decision made no change is needed). Other visual indicators/content is possible, of course, according to need or desire.

(4) Parameters Monitored/Operations Controlled

A list of parameters for this specific embodiment is set forth at the beginning of its description. It is to be understood that this is by way of example only and it can vary according to need or desire.

(d) Methods FIGS. 8A-B

FIG. 8A illustrates a non-limiting method 300 of how a control subsystem 110 could be developed. As discussed above, a designer of such a system would start (step 302) with making choices. Examples are a design software to generate content and graphics (step 304) and a common protocol (step 304). Using those tools, the designer would program the HMI/GUI and default configurations; examples of which have been discussed above regarding FIGS. 6A-E.

FIG. 8B illustrates a non-limiting method 310 of how to use control subsystem 110. User authentication (step 312) gains access by a user. Level of permission (step 314) can be automatically policed by the authentication user-by-user. A user authorized to change configurations can review them ((step 316) —see non-limiting examples shown in FIGS. 6A-E) and make either no changes or desired changes (step 318). Users not authorized to make changes can view the content generated at touchscreen 112 and/or a permitted remote device 119 by appropriate access at either on-site touchscreen 112 or connection via a permitted remote device 119 (steps 320, 322, 324). As mentioned, whether or not at the on-site touchscreen 112 or via a remote device 119, the content generated on the touchscreen can be shared to any properly connected remote device 119. As explained above, data gained from sensors, from states or status, or quantified (e.g. non-limiting examples are content displayed in main screen 200 or other screens in FIG. 6A-E or 7A-E) can be programmed to be saved in-system (e.g. in data storage medium such as RAM or ROM or cloud-based) (step 326). Such data can then be accessed and used (e.g. for historical information in main screen 200, or in dedicated historical-based data screens such as FIGS. 7D and E as non-limiting examples). In one example, method 310 evaluates, processes, compares, or otherwise uses data sensed, derived, or produced by features of system 100 and can automatically generate some type of notification (step 332) based on the same. In one non-limiting example, if a sensor measures or detects an operating parameter which is outside setpoint or other configuration range or limits, some type of alarm can be generated as the "notification". This could be one of the color coded, animated, displayed, or otherwise rendered graphics on touchscreen 112 and/or remote device 119 display. The notification/alarm can be designed to try to get the attention of a user. Alternatively, an alarm/notification can be an automatically generated communication different from on-screen content 113. Non-limiting examples are text messages or emails (e.g. that have been entered in initial configuration programming or added by an authorized user with reconfiguration or configuration change privileges). These communications, of course, are communications that leave system 100 and are sent via internet or cellular network (or other WANs) to such text or email addresses. This allows another way to try to get the attention of a user. As will be appreciated, notifications do not have to be alarms in the sense that out-of-limit conditions exist. They could simply be messages related to trending towards an out-of-limit condition, some scheduled maintenance reminder, or the like.

D. Options and Alternatives

1. Overview

As will be appreciated by those skilled in this technical field, the invention is not limited to the exemplary embodiments. For example, variations obvious to those skilled in the art are included within the scope of the present invention and its aspects.

Additional non-limiting examples follow.

2. Examples a. Aquatic Facility

The invention can be applied to a wide variety of aquatic facilities. They can include one water basis or a plurality. They can include large commercial, municipal, or similar facilities including large Olympic sized or larger basins. They can include smaller basins and even residential type pools. One of the aspects of the invention is its effective scalability which includes a range of sizes and capabilities/operations for each facility. And it includes the effective way to present the visualization of each facility.

b. Control System/Room/Enclosures/Panels

The invention can be applied to a wide variety of physical facility layouts. Some might have a dedicated and separate control room for the control subsystem and at least some of the other subsystems. Others may have some subsystems separate from the control subsystem (e.g. rooms under the basin or in fenced-in areas at or near the basin.

In the specific example, the base controller/computer/touchscreen are in the same enclosure box, and any expansion panel in a separate enclosure. But in some cases, the base components and one or more expansion components can be in the same enclosure. In some cases, enclosure boxes are not necessarily needed.

c. Monitor/Sensors/Sensed Parameters

As will be appreciated by those skilled in this technical field, a variety of sensors capable of transducing, measuring, or detecting something relevant to the direct or indirect estimation of a parameter useable by a system of the type of the invention are possible. The parts lists related to the specific embodiment give examples. Others are, of course possible.

d. Control/Actuators/Operations

Similarly, the specific sensors and actuators used or needed for a facility and its operations can vary according to need or desire.

e. Subsystem Components

Similarly, components such as heaters, pumps, vessels, tanks, injectors, and the like used in subsystems discussed above are commercially available. Those of skill in this technical area would be able to select and install the same.

f. Human Machine Interface (HMI), Computers, and Controllers

As will be appreciated by those skilled in the art, a variety of these components are possible for use with the invention and its aspects. The parts list for the specific embodiment lists a few examples.

Glossary

The glossary below is intended to give the reader an understanding of the plain and ordinary meaning of terms that are used herein or could be applicable to the exemplary embodiments. Not all are relevant to every possible exemplary embodiment.

Non-transitory Computer Readable Medium

In communications and computing, a computer readable medium is a medium capable of storing data in a format readable by a mechanical device. The teen "non-transitory" is used herein to refer to computer readable media ("CRM") that store data for short periods or in the presence of power such as a memory device.

Modules/Programs

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

Processing Unit

In computing, a processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, and other computing devices.

Intelligent Control/Microcontroller/Computer Processor/Etc

The controllers according to the aspects of the present disclosure may also include components such as an intelligent control (i.e., a programmable digital device) and communication components. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

Memory

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Operating System/Compiler

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

Database

To the extent used herein, a database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

Cloud Computing

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

Exemplary Characteristics of a Cloud Computing Model

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Exemplary Service Models of a Cloud Computing Model

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Exemplary Deployment Models of a Cloud Computing Model

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

Power Supplies

The power supply outputs a particular voltage to a device or component or components of a device. The power supply could be a direct current ("DC") power supply (e.g., a battery), an alternating current ("AC") power supply, a linear regulator, etc. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH") battery, a nickel-cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

Graphical User Interface, Screens/Displays

A user interface is how the user interacts with a machine. The user interface can be a digital interface, a command-line interface, a graphical user interface ("GUI") or any other way a user can interact with a machine. For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

Sensors

Furthermore, it is contemplated that the system includes sensors and/or modules. Modules can be placed on and around the aquatic facility and include various sensors to provide information to an intelligent control. The sensors may include vision sensors, heat sensors, moisture content sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine soil characteristics, such as moisture content, temperature, pressure, environmental conditions, fluid or particulate levels, and the like. The sensors can then indicate to actuators or other mechanisms to report state, status, or an undesirable situation.

Other Sensors

The sensors sense one or more characteristics of an object, subsystem, or operational parameter and can include, for example, position sensors, pressure sensors (including weight sensors), or fluid level sensors among many others. The position sensors can sense the position of one or more components of an object. For example, the position sensors can sense the position of an object relative to another fixed object such as a wall. Pressure sensors can sense the pressure of a gas or a liquid or even the weight of an object. The fluid level sensors can sense a measurement of fluid contained in a container or the depth of a fluid in its natural form such as water in a river or a lake. Fewer or more sensors can be provided as desired. For example, a rotational or flow sensor can be used to detect speed(s) or flow rate of a substance (fluid or particular states), a photodetector can be used to detect light or other electromagnetic radiation, a distance sensor can be used to detect the distance an object has traveled, a timer can be used for detecting a length of time an object has been used and/or the length of time any component has been used, and a temperature sensor can be used to detect the temperature of an object or fluid.

Networks, Communication Protocols, and Network Security

In some embodiments, the network is, by way of example only, a wide area network ("WAN") such as a TCP/IP based network or a cellular network; a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

Communication Ports

In some embodiments, a device could include one or more communications ports such as Ethernet, serial advanced technology attachment ("SATA"), universal serial bus ("USB"), or integrated drive electronics ("IDE"), for transferring, receiving, or storing data.

Software Licensing and Delivery for Cloud-Based Systems

In some embodiments; a cloud-based network is used. A software licensing and delivery model for a cloud-based network could be software as a service (SaaS), infrastructure as a service (IaaS), platform as a service (PaaS), desktop as a service (DaaS), a managed service provider, mobile backend as a service (MBaaS), or information technology management as a service (ITMaaS).

Lighting

Some aquatic facilities use artificial lighting or light fixtures may be implemented within the apparatus or system to achieve a practical or aesthetic affect consistent with the objects of the present disclosure, such as illuminating an area for visibility or for warning others about a potential hazard. Nonlimiting examples of artificial lighting include incandescent lamps, halogen lamps, parabolic aluminized reflector lamps, fluorescent lamps, electrodeless or induction lamps, laser lamps, light emitting diode ("LED") lamps, electron-stimulated luminescence lamps, combustion-based lamps (e.g., gas lamps, oil lamps), arc lamps, gas discharge lamps, and high-intensity discharge (HID) lamps. Light fixtures require a power source.

What is claimed is:
1. A system to monitor and control of operation of an aquatic facility comprising:
  a. at least one swimming pool comprising a basin to be filled with water;
  b. a water supply subsystem in operative connection to the swimming pool;
  c. at least one heater subsystem in operative connection to the water supply subsystem;
  d. at least one water chemical supply subsystem in operative connection to the water supply subsystem;
  e. at least one filter subsystem in operative connection to the water supply subsystem;
  f. a control subsystem comprising:
    i. an enclosure box at which is mounted:
      1. A base controller including:
        a. a plurality of inputs;
        b. a plurality of outputs; and
      2. a human-machine interface (HMI) operatively connected to the base controller; and
      3. a power supply operatively connected to the base controller and HMI;
    ii. a plurality of sensors which does not exceed the plurality of inputs of the base controller, each sensor operatively connected to one of the plurality of inputs of the base controller, each sensor adapted to directly or indirectly sense one of a pre-selected set of parameters related to the operation of the aquatic facility;
    iii. a plurality of actuators which does not exceed the plurality of outputs of the base controller, each actuator operatively connected to one of the outputs of the base controller, each actuator adapted to directly or indirectly actuate one of a pre-selected set of operations related to operation of the aquatic facility;

g. wherein the base controller is programmable with a common programming format relative to:
  i. configurable setpoints, values, or states for at least a base subset of the plurality of sensors for each of at least a base subset of parameters selected from the set of parameters related to operation of the aquatic facility; and
  ii. actuation of at least a base subset of the plurality of actuators for each of at least a base subset of operations selected from the set of operations related to operation of the aquatic facility;
h. wherein the HMI is programmable with the common programming format relative to:
  i. graphical representation of:
    1. The swimming pool and the water supply, at least heater, at least one water chemical supply, and at least one filter subsystems; and
    2. The pre-selected operations related to present operation of the aquatic system; and
  ii. graphical representation of:
    1. Quantification of at least two or more of the parameters sensed by the at least two or more of the plurality of sensors; and
    2. Status of at one of:
      a. one or more of the quantified parameters relative to the programmed setpoints, values, or states; and
      b. one or more of the parameters relative to the set of operations related to the aquatic facility.

2. The system of claim 1 wherein:
a. the inputs comprise a plurality of universal inputs, and
b. the outputs comprise a plurality of digital outputs and a plurality of analog outputs.

3. The system of claim 1 further comprising:
a. an expansion module comprising:
  i. an enclosure box at which is mounted:
    1. An expansion controller having:
      a. a plurality of inputs;
      b. a plurality of outputs; and
  ii. one or more additional sensors which does not exceed the plurality of inputs of the expansion controller, each additional sensor operatively connected to one of the plurality of inputs of the expansion controller, each additional sensor adapted to directly or indirectly sense one of a pre-selected set of parameters related to the operation of the aquatic facility and/or an additional subsystem; and/or
  iii. one or more additional actuators which does not exceed the plurality of outputs of the expansion controller, each additional actuator operatively connected to one of the outputs of the expansion controller, each additional actuator adapted to directly or indirectly actuate one of a pre-selected set of operations related to operation of the aquatic facility and/or the additional subsystem;
b. wherein the expansion controller is programmable with the common programming format of the base controller and the HMI relative to:
  i. setpoints, values, or states for at least a subset of the one or more additional sensors; and/or
  ii. actuation of at least a subset of the additional actuators;
c. wherein the HMI is programmable with the common programming format relative to:
  i. graphical representation of:
    1. The swimming pool and the water supply, at least heater, at least one water chemical supply, and at least one filter subsystems, and any additional subsystem;
    2. The pre-selected operations related to present operation of the aquatic system and its subsystems; and
  ii. graphical representation of:
    1. Quantification of at least two or more of the parameters sensed by the at least two or more of the plurality of sensors, including the additional sensors; and
    2. status of at least one of:
      a. one or more of the quantified parameters relative to the programmed setpoints, values, or states, including the additional sensors; and
      b. one or more of the parameters relative to the set of operations related to the aquatic facility, including any additional subsystem.

4. The system of claim 3 further comprising:
a. one or more additional expansion modules, each comprising:
  i. an enclosure box at which is mounted:
    1. An additional expansion controller having:
      a. a plurality of inputs;
      b. a plurality of outputs; and
  ii. one or more additional sensors which does not exceed the plurality of inputs of the additional controller, each additional sensor operatively connected to one of the plurality of inputs of the expansion controller, each additional sensor adapted to directly or indirectly sense one of a pre-set of parameters related to the operation of the aquatic facility and/or an additional subsystem; and/or
  iii. one or more additional actuators which does not exceed the plurality of outputs of the expansion controller, each additional actuator operatively connected to one of the outputs of the expansion controller, each additional actuator adapted to directly or indirectly actuate one of a pre-selected set of operations related to operation of the aquatic facility and/or the additional subsystem;
b. wherein the additional expansion controller is programmable with the common programming format of the base controller and the HMI relative to:
  i. setpoints, values, or states for at least a subset of the one or more additional sensors; and/or
  ii. actuation of at least a subset of the additional actuators;
c. wherein the HMI is programmable with the common programming format relative to:
  i. graphical representation of:
    1. The swimming pool and the water supply, at least heater, at least one water chemical supply, and at least one filter subsystems, and any additional subsystem;
    2. The pre-selected operations related to present operation of the aquatic system and its subsystems; and
  ii. graphical representation of:
    1. Quantification of at least two or more of the parameters sensed by the at least two or more of the plurality of sensors, including the additional sensors; and 2. status of at least one of:
   a. one or more of the quantified parameters relative to the programmed setpoints, values, or states, including the additional sensors; and
   b. one or more of the parameters relative to the set of operations related to the aquatic facility, including any additional subsystem.

5. The system of claim 1 further comprising a communication component programmed to generate one or more notifications from the base controller to one or more of:
   a. the HMI;
   b. one or more remote devices sharing the HMI;
   c. one or more text message or email accounts;
wherein the notification comprises one or more of:
   d. an alarm that a setpoint, value, or state has been exceeded;
   e. an alarm relating to a state of a parameter, an operation, or a subsystem;
   f. an informational communication.

6. The system of claim 1 wherein the control subsystem further comprises:
   a. a communications interface in operative connection to the base controller, the communications interface adapted for wide-area network communications;
   b. one or more wide-area network enabled digital devices,
   c. each of the one or more wide-area network enable digital devices adapted for a level of permissions relative to the HMI and the base controller.

7. The system of claim 6 wherein the wide-area network comprises the internet.

8. The system of claim 7 wherein the communications interface and HMI graphics are webpage based.

9. The system of claim 6 wherein:
   a. the level of permissions comprises one of:
      i. access to view the HMI; and
      ii. access to both view the HMI and reconfigure one or more setpoints, values, or states; and
   b. permission for a level of permissions is through an authentication protocol including at least one factor authentication.

10. The system of claim 1 wherein the parameters relating to operation of the aquatic facility comprise one or more of:
   a. Pool Water Temperature
   b. Pool Heater System Supply Water Temperature
   c. Pool Heater System Return Water Temperature
   d. Individual Heater Water Temperatures
   e. Room Temperature
   f. Room Humidity
   g. Building Air Intake Temperature
   h. Building Air Exhaust Temperature
   i. Outdoor Temperature
   j. Outdoor Humidity
   k. Water Flow to Pools
   l. Water Flow through Heaters
   m. Water Flow—Makeup Water
   n. Effluent Pool Filter Pressure (output)
   o. Influent Pool Filter Pressure (input)
   p. Effluent Strainer Pressure (output)
   q. Influent Strainer Pressure (input)
   r. Pool Water Level
   s. Heater Water Level
   t. Water pH
   u. Water Chlorine
   v. Chemical Tank Levels
   w. Moisture Sensors in Dry Areas (leak monitoring)
   x. UV water treatment.

11. A method of monitoring and controlling of operation of an aquatic facility comprising at least one swimming pool comprising a basin to be filled with water; a water supply subsystem in operative connection to the swimming pool; at least one heater subsystem in operative connection to the water supply subsystem; at least one water chemical supply subsystem in operative connection to the water supply subsystem; at least one filter subsystem in operative connection to the water supply subsystem; the method comprising:
   a. installing a control subsystem comprising:
      i. an enclosure box at which is mounted:
         1. A base controller including:
            a. a plurality of inputs;
            b. a plurality of outputs; and
         2. a human-machine interface (HMI) operatively connected to the base controller; and
         3. a power supply operatively connected to the base controller and HMI;
      ii. a plurality of sensors which does not exceed the plurality of inputs of the base controller, each sensor operatively connected to one of the plurality of inputs of the base controller; each sensor adapted to directly or indirectly sense one of a pre-selected set of parameters related to the operation of the aquatic facility;
      iii. a plurality of actuators which does not exceed the plurality of outputs of the base controller, each actuator operatively connected to one of the outputs of the base controller, each actuator adapted to directly or indirectly actuate one of a pre-selected set of operations related to operation of the aquatic facility;
   b. wherein the base controller is programmed with a common programming format relative to:
      i. setpoints, values, or states for at least a base subset of the plurality of sensors for each of at least a base subset of parameters selected from the set of parameters related to operation of the aquatic facility; and
      ii. actuation of at least a base subset of the plurality of actuators for each of at least a base subset of operations selected from the set of operations related to operation of the aquatic facility;
   c. wherein the HMI is programmed with the common programming format relative to:
      i. graphical representation of:
         1. The swimming pool and the water supply, at least heater, at least one water chemical supply, and at least one filter subsystems; and
         2. The pre-selected operations related to present operation of the aquatic system; and
      ii. graphical representation of:
         1. Quantification of at least two or more of the parameters sensed by the at least two or more of the plurality of sensors; and
         2. status of at least one of:
            a. one or more of the quantified parameters relative to the programmed setpoints, values, or states; and
            b. one or more of the parameters relative to the set of operations related to the aquatic facility.

12. The method of claim 11 wherein:
   a. the inputs comprise a plurality of universal inputs, and
   b. the outputs comprise a plurality of digital outputs and a plurality of analog outputs.

13. The method of claim 11 further comprising:
a. expanding the control sub-system with an expansion module comprising:
   i. an enclosure box at which is mounted:
      1. An expansion controller having:
         a. a plurality of inputs;
         b. a plurality of outputs; and
   ii. one or more additional sensors which does not exceed the plurality of inputs of the expansion controller, each additional sensor operatively connected to one of the plurality of inputs of the expansion controller, each additional sensor adapted to directly or indirectly sense one of a pre-selected set of parameters related to the operation of the aquatic facility and/or an additional subsystem; and/or
   iii. one or more additional actuators which does not exceed the plurality of outputs of the expansion controller, each additional actuator operatively connected to one of the outputs of the expansion controller, each additional actuator adapted to directly or indirectly actuate one of a pre-selected set of operations related to operation of the aquatic facility and/or the additional subsystem;
b. wherein the expansion controller is programmable with the common programming format of the base controller and the HMI relative to:
   i. setpoints, values, or states for at least a subset of the one or more additional sensors; and/or
   ii. actuation of at least a subset of the additional actuators;
c. wherein the HMI is programmable with the common programming format relative to:
   i. graphical representation of:
      1. The swimming pool and the water supply; at least one heater; at least one water chemical supply, and at least one filter subsystem, and any additional subsystem;
      2. The pre-selected operations related to present operation of the aquatic system and its subsystems; and
   ii. graphical representation of:
      1. Quantification of at least some of the parameters sensed by the at least some of the plurality of sensors; including the additional sensors; and
      2. status of at least one of:
         a. one or more of the quantified parameters relative to the programmed setpoints, values, or states, including the additional sensors; and
         b. one or more of the parameters relative to the set of operations related to the aquatic facility, including any additional subsystem.

14. The method of claim 13 further comprising:
a. expanding the control subsystem with one or more additional expansion modules, each comprising:
   i. an enclosure box at which is mounted:
      1. An additional expansion controller having:
         a. a plurality of inputs;
         b. a plurality of outputs; and
   ii. one or more additional sensors which does not exceed the plurality of inputs of the additional controller, each additional sensor operatively connected to one of the plurality of inputs of the expansion controller, each additional sensor adapted to directly or indirectly sense one of a pre-selected set of parameters related to the operation of the aquatic facility and/or an additional subsystem; and/or
   iii. one or more additional actuators which does not exceed the plurality of outputs of the expansion controller, each additional actuator operatively connected to one of the outputs of the expansion controller, each additional actuator adapted to directly or indirectly actuate one of a pre-selected set of operations related to operation of the aquatic facility and/or the additional subsystem;
b. wherein the additional expansion controller is programmable with the common programming format of the base controller and the HMI relative to:
   i. setpoints, values, or states for at least a subset of the one or more additional sensors; and/or
   ii. actuation of at least a subset of the additional actuators;
c. wherein the HMI is programmable with the common programming format relative to:
   i. graphical representation of:
      1. The swimming pool and the water supply, at least one heater, at least one water chemical supply, and at least one filter subsystems, and any additional subsystem;
      2. The pre-selected operations related to present operation of the aquatic system and its subsystems; and
   ii. graphical representation of:
      1. Quantification of at least two or more of the parameters sensed by the at least two or more of the plurality of sensors, including the additional sensors; and
      2. status of at least one of:
         a. one or more of the quantified parameters relative to the programmed setpoints, values, or states, including the additional sensors; and
         b. one or more of the parameters relative to the set of operations related to the aquatic facility, including any additional subsystem.

15. The method of claim 11 further comprising:
a. providing a communications interface in operative connection to the base controller, the communications interface adapted for wide-area network communications;
b. providing one or more wide-area network enabled digital devices;
c. each of the one or more wide-area network enable digital devices adapted for a level of permissions relative to the HMI and the base controller.

16. The method of claim 15 wherein the wide-area network comprises the internet.

17. The method of claim 16 wherein the communications interface and HMI graphics are web-page based.

18. The method of claim 15 wherein:
a. the level of permissions comprises one of:
   i. access to view the HMI; and
   ii. access to both view the HMI and reconfigure one or more setpoints, values, or states; and
b. permission for a level of permissions is through an authentication protocol including at least one factor authentication.

19. The method of claim 15 wherein the communications interface is adapted to send a notification from the base controller to a text message or email address, and the notification comprises one or more of:

a. an alarm that a setpoint, value, or state has been exceeded;
    b. an alarm relating to a state of a parameter, an operation, or a subsystem;
    c. an informational communication.

20. The method of claim 11 wherein the parameters relating to operation of the aquatic facility comprise one or more of:
    a. Pool Water Temperature
    b. Pool Heater System Supply Water Temperature
    c. Pool Heater System Return Water Temperature
    d. Individual Heater Water Temperatures
    e. Room Temperature
    f. Room Humidity
    g. Building Air Intake Temperature
    h. Building Air Exhaust Temperature
    i. Outdoor Temperature
    j. Outdoor Humidity
    k. Water Flow to Pools
    l. Water Flow through Heaters
    m. Water Flow—Makeup Water
    n. Effluent Pool Filter Pressure (output)
    o. Influent Pool Filter Pressure (input)
    p. Effluent Strainer Pressure (output)
    q. Influent Strainer Pressure (input)
    r. Pool Water Level
    s. Heater Water Level
    t. Water pH
    u. Water Chlorine
    v. Chemical Tank Levels
    w. Moisture Sensors in Dry Areas (leak monitoring)
    x. UV water treatment.

21. A system for monitor and control of operation of an aquatic facility comprising:
    a. at least one basin to be filled with water;
    b. a water supply subsystem in operative connection to the basin;
    c. one or more further subsystems related to facility operations;
    d. a control subsystem comprising:
        i. an enclosure box at which is mounted:
            1. A base controller including:
                a. a plurality of inputs;
                b. a plurality of outputs; and
            2. a human-machine interface (HMI) operatively connected to the base controller;
        ii. a plurality of sensors which does not exceed the plurality of inputs of the base controller, each sensor operatively connected to one of the plurality of inputs of the base controller, each sensor adapted to directly or indirectly sense one of a pre-selected set of parameters related to the operation of the aquatic facility;
        iii. a plurality of actuators which does not exceed the plurality of outputs of the base controller, each actuator operatively connected to one of the outputs of the base controller, each actuator adapted to directly or indirectly actuate one of a pre-selected set of operations related to operation of the aquatic facility;
    e. wherein the base controller is programmable with a common programming format relative to:
        i. at least a base subset of parameters each measurable directly or indirectly by a sensor related to operation of the aquatic facility; and
        ii. at least a base subset of operations that can be instructed via electromechanical actuator selected from the set of operations related to operation of the aquatic facility;
    f. wherein the HMI is programmable with the common programming format relative to:
        i. graphical representation of:
            1. The at least one basin and the water supply subsystem, and the one or more further subsystems; and
            2. The pre-selected operations related to present operation of the aquatic system; and
        ii. graphical representation of:
            1. Quantification of at least two or more of the parameters sensed by the sensors; and
            2. status of at least one or more of the parameters operations related to the aquatic facility.

22. The system of claim 21 further comprising:
    a. an expansion module operatively connected to the base controller, the expansion module comprising:
        i. an expansion controller having:
            a. a plurality of inputs operatively connected to one or more additional sensors;
            b. a plurality of outputs adapted for connection to one or more actuators;
    b. wherein the expansion controller is programmable with the common programming format of the base controller and the HMI;
    c. wherein the HMI is programmable with the common programming format relative to:
        i. graphical representation of:
            1. The basin and the water supply, and one or more subsystems;
            2. The pre-selected operations related to present operation of the aquatic system and its subsystems; and
            3. quantification of at least some of the parameters sensed by the at least some of the plurality of sensors, including the additional sensors.

\* \* \* \* \*

UNITED STATES PATENT AND TRADEMARK OFFICE
CERTIFICATE OF CORRECTION

Page 1 of 1

PATENT NO. : 11,567,468 B2
APPLICATION NO. : 16/948848
DATED : January 31, 2023
INVENTOR(S) : Pleva et al.

It is certified that error appears in the above-identified patent and that said Letters Patent is hereby corrected as shown below:

On the Title Page

Item (72) Inventors, at Line 2:
DELETE: "Patrick D. Gashe, Perry, IA (US)"
INSERT: --Patrick D. Gasche, Perry, IA (US)--

Signed and Sealed this
Sixth Day of June, 2023

Katherine Kelly Vidal
*Director of the United States Patent and Trademark Office*